United States Patent
Kurasawa et al.

(10) Patent No.: US 9,846,322 B2
(45) Date of Patent: Dec. 19, 2017

(54) DISPLAY DEVICE AND ELECTRONIC DEVICE

(71) Applicant: Japan Display Inc., Minato-ku (JP)

(72) Inventors: Hayato Kurasawa, Minato-ku (JP); Hiroshi Mizuhashi, Minato-ku (JP); Toshiaki Fukushima, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 182 days.

(21) Appl. No.: 14/696,667

(22) Filed: Apr. 27, 2015

(65) Prior Publication Data
US 2015/0332647 A1 Nov. 19, 2015

(30) Foreign Application Priority Data
May 13, 2014 (JP) .................................. 2014-100002

(51) Int. Cl.
*G02F 1/133* (2006.01)
*G02F 1/1343* (2006.01)
(Continued)

(52) U.S. Cl.
CPC .... *G02F 1/13306* (2013.01); *G02F 1/133514* (2013.01); *G02F 1/134336* (2013.01);
(Continued)

(58) Field of Classification Search
CPC ............... G09G 3/3614; G09G 3/2003; G09G 2300/0426; G09G 2320/04; G02F 1/134336; G02F 1/133514
See application file for complete search history.

(56) References Cited

U.S. PATENT DOCUMENTS 6,552,706 B1 * 4/2003 Ikeda .................. G09G 3/3607
345/100
2004/0012058 A1 1/2004 Aoki
(Continued)

FOREIGN PATENT DOCUMENTS

CN 100458871 C 2/2009
CN 101510034 A 8/2009
(Continued)

OTHER PUBLICATIONS

Notification of Comments dated Feb. 22, 2016 in Korean Patent Application No. 10-2015-0063146 (with English language translation).

(Continued)

*Primary Examiner* — Shaheda Abdin
(74) *Attorney, Agent, or Firm* — Oblon, McClelland, Maier & Neustadt, L.L.P.

(57) ABSTRACT

According to one embodiment, a display device includes first, second, and third interconnects, switch elements, pixel electrodes, a display layer, and a controller. The switch elements are arranged in a matrix configuration, and connected to the first and second interconnects. The pixel electrodes are electrically connected to the switch elements. The third interconnects oppose the pixel electrodes. The display layer is provided on the pixel electrodes. The controller is electrically connected to the first, second, and third interconnects. The second interconnects include a first color interconnect. The controller performs a first operation of sequentially selecting the first interconnects and supplying a first color image signal to the first color interconnect. The controller performs a second operation of sequentially selecting the first interconnects and supplying a second color image signal to the first color interconnect. The controller (Continued)

performs a third operation being different from the first and second operations.

20 Claims, 10 Drawing Sheets

(51) Int. Cl.
    *G02F 1/1335*     (2006.01)
    *G09G 3/20*     (2006.01)
    *G06F 3/041*     (2006.01)
    *G09G 3/36*     (2006.01)

(52) U.S. Cl.
    CPC .......... *G06F 3/0412* (2013.01); *G06F 3/0416* (2013.01); *G09G 3/2003* (2013.01); *G09G 3/3648* (2013.01); *G09G 3/3607* (2013.01); *G09G 3/3614* (2013.01); *G09G 2300/0426* (2013.01); *G09G 2310/0248* (2013.01); *G09G 2320/04* (2013.01); *G09G 2330/00* (2013.01)

(56) References Cited

U.S. PATENT DOCUMENTS

| | | | |
|---|---|---|---|
| 2004/0218127 A1 | 11/2004 | Miura | |
| 2006/0097975 A1* | 5/2006 | Lee | G02F 1/13338 345/98 |
| 2007/0205972 A1* | 9/2007 | Asao | G09G 3/3614 345/88 |
| 2008/0186289 A1 | 8/2008 | Ijima et al. | |
| 2009/0303166 A1 | 12/2009 | Tsubata | |
| 2010/0097366 A1* | 4/2010 | Kitayama | G09G 3/3655 345/213 |
| 2011/0148944 A1 | 6/2011 | Kobayashi | |
| 2011/0157131 A1* | 6/2011 | Miyake | G09G 3/3614 345/211 |
| 2015/0310792 A1 | 10/2015 | Fukushima et al. | |

FOREIGN PATENT DOCUMENTS

| | | |
|---|---|---|
| CN | 103293810 A | 9/2013 |
| JP | 2008-21208 A | 1/2008 |
| JP | 2008-191465 A | 8/2008 |
| JP | 2013-076795 | 4/2013 |
| TW | 548625 B | 8/2003 |
| TW | 200405760 A | 4/2004 |
| TW | 200424981 A | 11/2004 |
| TW | 201133822 A1 | 10/2011 |
| WO | WO 2006/030544 A1 | 3/2006 |
| WO | WO 2008/038431 A1 | 4/2008 |

OTHER PUBLICATIONS

Office Action dated Aug. 28, 2016 in Korean Patent Application No. 10-2015-0063146 (with English language translation).
Combined Taiwanese Office Action and Search Report dated Aug. 29, 2016 in Patent Application No. 104114500 (with English language translation).
U.S. Appl. No. 14/690,659, filed Apr. 20, 2015, Fukushima, et al.
U.S. Appl. No. 14/708,856, filed May 11, 2015, Kurasawa, et al.
Office Action issued in Chinese Patent Application No. 201510228043.X on Jul. 19, 2017 with English Translation.

\* cited by examiner

DISPLAY DEVICE AND ELECTRONIC DEVICE

CROSS-REFERENCE TO RELATED APPLICATIONS

This application is based upon and claims the benefit of priority from Japanese Patent Application No. 2014-100002, filed on May 13, 2014; the entire contents of which are incorporated herein by reference.

FIELD

Embodiments described herein relate generally to a display device and an electronic device.

BACKGROUND

A display device that uses a liquid crystal, organic EL, etc., has been developed. Other than the display operation, for example, a non-display operation such as sensing a touch input, etc., may be performed in the display device. For example, the display operation may be paused to reduce the power consumption. It is desirable to maintain a high-quality display even when the non-display operation is performed.

SUMMARY OF THE INVENTION

According to one embodiment, a display device includes a plurality of first interconnects, a plurality of second interconnects, a plurality of switch elements, pixel electrodes, a plurality of third interconnects, a display layer, and a controller. The plurality of first interconnects extend in a first direction and are arranged in a second direction intersecting the first direction. The plurality of second interconnects extend in the second direction and are arranged in the first direction. The plurality of switch elements are arranged in a matrix configuration in the first direction and the second direction, and are connected to the first interconnects and the second interconnects at each position of the plurality of switch elements. The pixel electrodes are electrically connected respectively to the switch elements. The plurality of third interconnects extend in the second direction, are arranged in the first direction, and oppose the plurality of pixel electrodes. The display layer is provided on the plurality of pixel electrodes, and performs an optical operation of at least one of light emission or a change of an optical characteristic based on an electrical signal applied to each of the pixel electrodes. The controller is electrically connected to the plurality of first interconnects, the plurality of second interconnects, and the plurality of third interconnects. The plurality of first interconnects include a first group made of multiple mutually-adjacent first interconnects, and a second group disposed to be adjacent to the first group, the second group being made of multiple mutually-adjacent first interconnects. The plurality of second interconnects include a first color interconnect intersecting the first and second groups of the first interconnects. The controller performs, in a first display interval, a first operation of sequentially selecting the first interconnects belonging to the first group and supplying a first color image signal to the first color interconnect. The first color image signal of a first polarity has a potential of the third interconnects as a reference. The controller performs, in a second display interval after the first display interval, a second operation of sequentially selecting the first interconnects belonging to the second group and supplying a second color image signal to the first color interconnect. The second color image signal is a potential of a second polarity having the potential of the third interconnects as the reference. The second polarity is reverse to the first polarity. The controller performs a third operation in a non-display interval between the first display interval and the second display interval. The third operation is different from the first operation and the second operation.

According to another embodiment, a display device includes a pair of substrates, a liquid crystal layer, a plurality of pixel electrodes, a common electrode, and a controller. The liquid crystal layer is provided between the pair of substrates. The plurality of pixel electrodes are arranged in a matrix configuration on one of the substrates. The common electrode is provided on one of the substrates, and is disposed to oppose the plurality of pixel electrodes arranged in the matrix configuration. The controller applies a pixel signal to each of the pixel electrodes. In a state of pixel signals of mutually-inverted polarities being supplied to mutually-adjacent pixel columns, the controller further supplies pixel signals of mutually-inverted polarities to a first pixel row and a second pixel row. The pixel signals are applied to the first pixel row in a first display interval, and applied to the second pixel row in a second display interval after the first display interval. The second pixel row is arranged with the first pixel row.

According to another embodiment, a display device includes a pair of substrates, a liquid crystal layer, a plurality of pixel electrodes, a common electrode, a color filter layer, and a controller. The liquid crystal layer is provided between the pair of substrates. The plurality of pixel electrodes is arranged in a matrix configuration on one of the substrates. The common electrode is provided on one of the substrates, and disposed to oppose the plurality of pixel electrodes arranged in the matrix configuration. The color filter layer includes color columns respectively opposing the pixel columns. The controller applies a pixel signal to each of the pixel electrodes. The color columns of the color filter layer include at least three colors provided repeatedly in the pixel column direction. In a state of pixel signals of mutually-inverted polarities being supplied to mutually-adjacent pixel columns, the controller further supplies pixel signals of mutually-inverted polarities to a first pixel row and a second pixel row for only the pixel columns corresponding to at least one color. The pixel signals are applied to the first pixel row in a first display interval. The second pixel row is arranged with the first pixel row. The pixel signals are applied to the second pixel row in a second display interval after the first display interval.

DETAILED DESCRIPTION

Figure 1:
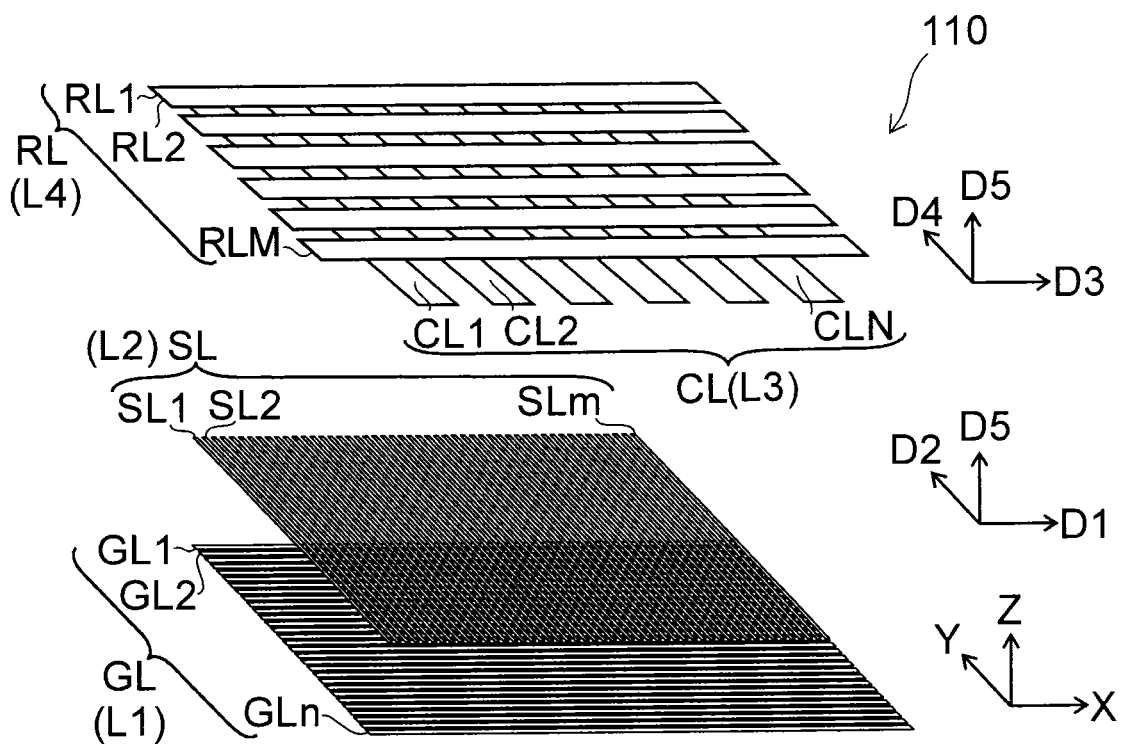
FIG. 1 is a schematic perspective view illustrating a display device according to a first embodiment.

Embodiments of the invention will now be described with reference to the drawings.

The disclosure is but an example; and appropriate modifications within the spirit of the invention will be readily apparent to one skilled in the art and naturally are within the scope of the invention. Moreover, although the widths, thicknesses, configurations, etc., of components in the drawings may be illustrated schematically compared to the actual embodiments for better clarification of description, these are merely examples and do not limit the construction of the invention.

Further, in the specification and the drawings, components similar to those described in regard to a drawing thereinabove are marked with like reference numerals, and a detailed description may be omitted as appropriate.

First Embodiment

FIG. 1 is a schematic perspective view illustrating a display device according to a first embodiment.

As shown in FIG. 1, the display device 110 according to the embodiment includes multiple first interconnects L1 (e.g., gate lines GL), multiple second interconnects L2 (e.g., signal lines SL), and multiple third interconnects L3 (e.g., common lines CL).

Each of the multiple first interconnects L1 extends in a first direction D1. The multiple first interconnects L1 are arranged in a second direction D2. The second direction D2 intersects the first direction D1. Although the second direction D2 is perpendicular to the first direction D1 in the embodiment, it is also possible to employ a configuration in which the second direction D2 intersects the first direction D1 in a state other than perpendicular.

Each of the multiple second interconnects L2 extends in the second direction D2. The multiple second interconnects L2 are arranged in the first direction D1.

Each of the multiple third interconnects L3 extends in the second direction D2. The multiple third interconnects L3 are arranged in the first direction D1.

A plane that includes the first direction D1 and the second direction D2 is taken as an X-Y plane. A direction perpendicular to the X-Y plane is taken as a Z-axis direction. One direction in the X-Y plane is an X-axis direction. One direction in the X-Y plane is a Y-axis direction. The Y-axis direction is perpendicular to the X-axis direction. In the example, the first direction D1 is parallel to the X-axis direction. The second direction D2 is parallel to the Y-axis direction. It is possible to employ a configuration in which the X-axis and the Y-axis intersect at an angle other than perpendicular.

Multiple fourth interconnects (e.g., sense lines RL) also are provided. The multiple fourth interconnects L4 are separated from the first to third interconnects L1 to L3 in the Z-axis direction. Each of the multiple fourth interconnects L4 extends in a third direction D3. The third direction D3 is parallel to the X-Y plane and intersects the second direction D2. The multiple fourth interconnects L4 are arranged in a fourth direction D4. The fourth direction is parallel to the X-Y plane and intersects the third direction D3. In the example, the third direction D3 is parallel to the X-axis direction; and the fourth direction D4 is parallel to the Y-axis direction.

The multiple gate lines GL include a first gate line GL1, a second gate line GL2, and an nth gate line GLn. The number of gate lines GL is n. n is any integer not less than 2. For example, n is 1920.

The multiple signal lines SL include a first signal line SL1, a second signal line SL2, and an mth signal line SLm. The number of signal lines SL is m. m is an integer not less than 2. For example, m is 1080×3. In other words, for example, in the case where the set of subpixels, i.e., a red pixel, a green pixel, and a blue pixel, is used as one component (pixel), the number of components is 1080. The signal lines SL are provided according to the number of multiple pixels arranged along the first direction. In the embodiment, m is arbitrary.

The multiple common lines CL include a first common line CL1, a second common line CL2, and an Nth common line CLN. The number of common lines CL is N. N is an integer not less than 2.

The multiple sense lines RL include, for example, a first sense line RL1, a second sense line RL2, and an Mth sense line RLM. The number of sense lines RL is M. M is an integer not less than 2.

In the example, the signal lines SL and the common lines CL are disposed between the gate lines GL and the sense lines RL. In the embodiment, various modifications are possible for the arrangement of these lines in a fifth direction D5.

As described below, the display of the image is performed using the multiple gate lines GL, the multiple signal lines SL, and the multiple common lines CL. Also, touch input sensing is performed using the multiple common lines CL and the multiple sense lines RL. In the embodiment, the sense lines RL may be omitted in the case where the touch operation is not performed.

Figure 2:
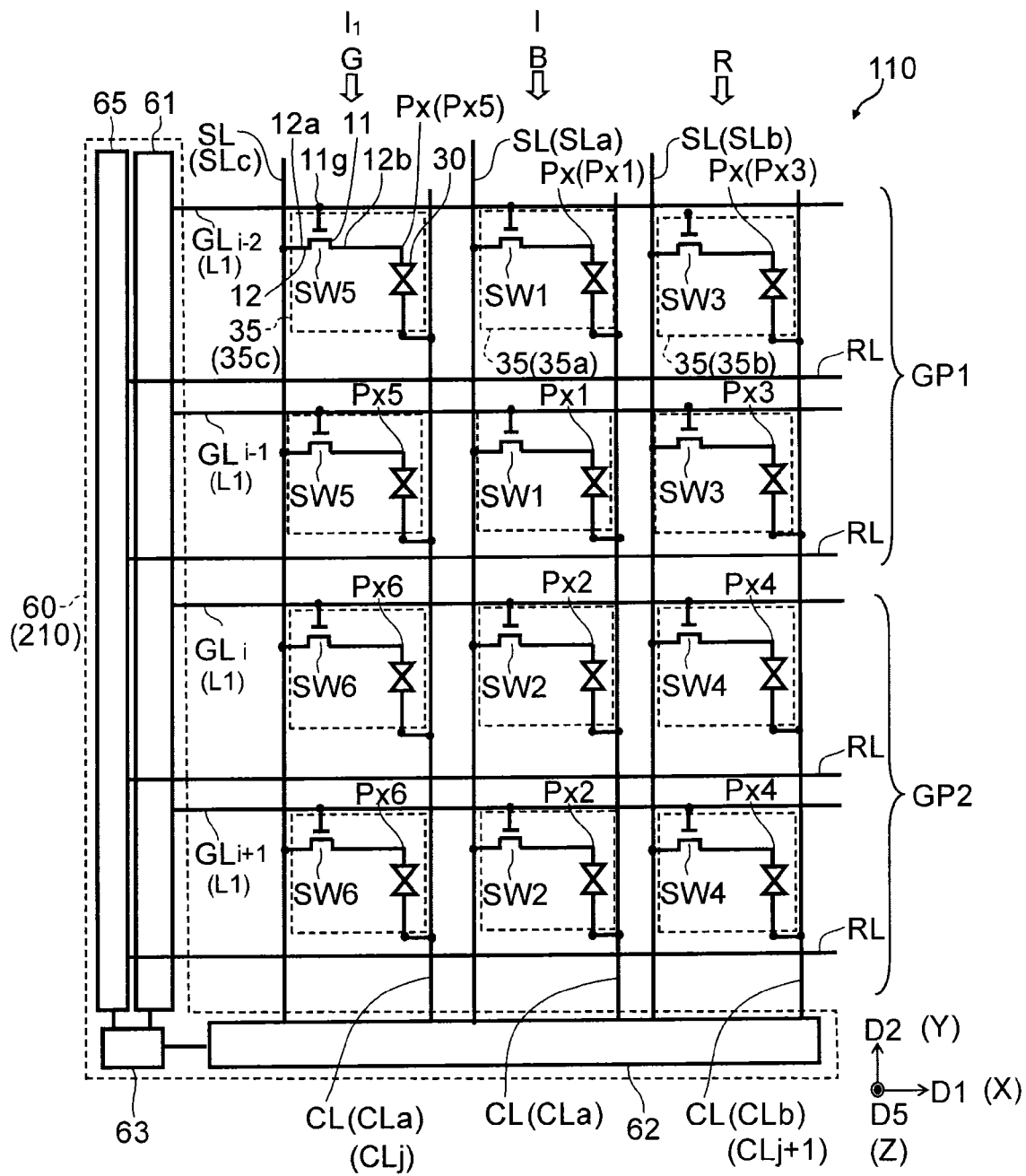
FIG. 2 is a schematic view illustrating the display device according to the first embodiment.

FIG. 2 is a schematic view illustrating the display device according to the first embodiment.

As illustrated in FIG. 2, multiple switch elements 11, multiple pixel electrodes Px, and a display layer 30 are provided in the display device 110. Each of the multiple switch elements is electrically connected to one of the multiple first interconnects L1 (the gate lines GL) and one of the multiple second interconnects L2 (the signal lines SL).

The switch element 11 includes a gate 11g and a semiconductor layer 12. The semiconductor layer 12 includes a first portion 12a and a second portion 12b. The gate 11g is electrically connected to one of the multiple gate lines GL. The first portion 12a of the semiconductor layer 12 is electrically connected to one of the multiple signal lines SL.

Each of the pixel electrodes Px is electrically connected to the second portion 12b of the semiconductor layer 12 of the switch element 11. Thus, by one pixel electrode Px being connected to one switch element 11, the multiple pixel electrodes Px as an entirety are arranged in a matrix configuration along the first direction D1 and the second direction D2.

Thus, for the pixel electrodes Px that are arranged in the matrix configuration, the arrangement of the multiple pixel electrodes Px arranged in the first direction is called a pixel row. The arrangement of the pixel electrodes Px arranged in the second direction is called a pixel column.

The display layer 30 performs an optical operation based on an electrical signal applied to the multiple pixel electrodes Px. The optical operation includes at least one of light emission or a change of an optical characteristic. As described below, the display layer 30 is provided between a pair of substrates.

In the case where a liquid crystal layer is used as the display layer 30, the optical operation includes a change of an optical characteristic. The optical characteristic includes, for example, at least one of birefringence, optical rotatory properties, scattering properties, light reflectance, or light absorptance. For example, the liquid crystal alignment of the display layer 30 (the liquid crystal layer) changes due to the electrical signal that is applied to the pixel electrodes Px; and the effective birefringence changes. At least one of optical rotatory properties, scattering properties, light reflectance, or light absorptance may change.

For example, in the case where a light emitting layer (e.g., an organic light emitting layer) is used as the display layer 30, the optical operation includes light emission (the emission of light). In other words, the display layer 30 performs an optical operation of at least one of light emission or a change of an optical characteristic.

As illustrated in FIG. 2, a controller 60 (a drive device 210) is provided in the display device 110.

The controller 60 includes a first drive circuit 61, a second drive circuit 62, and a control circuit 63. The first drive circuit 61 is electrically connected to the multiple gate lines GL. The second drive circuit 62 is electrically connected to the multiple signal lines SL and the multiple common lines CL. The control circuit 63 is electrically connected to the first drive circuit 61 and the second drive circuit 62. The appropriate signal processing of the electrical signals (including image signals) acquired by the control circuit 63 is performed. The electrical signals for which the signal processing is performed are supplied to the first drive circuit 61 and the second drive circuit 62.

The optical operation of the display layer 30 (e.g., the liquid crystal layer) at multiple pixels 35 is controlled by the gate lines GL, the signal lines SL, the switch elements 11, the pixel electrodes Px, and the common lines CL. Thereby, the display is performed. In the display operation, the common lines CL are used as counter electrodes (also called common electrodes) of the pixel electrodes Px. In other words, the potential of each of the multiple pixel electrodes Px is controlled by the electrical signal being supplied to the pixel electrode Px via the switch element 11. The display is performed by the alignment of the liquid crystal changing due to the electric field generated by the pixel electrodes Px and the common lines CL.

In the embodiment, a sense circuit 65 is further provided in the controller 60. The sense circuit 65 is electrically connected to the sense lines RL. In the sense operation, for example, the capacitance that is created between each of the multiple common lines CL and each of the multiple sense lines RL is sensed by the second drive circuit 62 and the sense circuit 65.

More specifically, the touch input to the display device 110 is sensed by the multiple sense lines RL and the multiple common lines CL. In the sense operation, an input member (e.g., an input pen, etc.), a finger of a viewer (a user) of the display device 110, etc., is in contact with or proximal to the display device 110. The electrical capacitance that is created by the sense lines RL and the common lines CL changes due to the contact or proximity recited above. The touch input is sensed by sensing the change of the electrical capacitance. The touch input includes contact in which the sense lines RL are contacted, and the state of being proximal to the sense lines RL while being separated from the sense lines RL (hovering).

In the embodiment as described above, the common lines CL (the third interconnects L3) are used as counter electrodes for the touch sensing while being used as counter electrodes for the display.

As shown in FIG. 2, the multiple first interconnects L1 (the gate lines GL) include a first group GP1 and a second group GP2. As described below, the display at the pixels 35 corresponding to the first group GP1 is performed by sequentially scanning the first interconnects L1 included in the first group GP1. Subsequently, the display at the pixels 35 corresponding to the second group GP2 is performed by sequentially scanning the first interconnects L1 included in the second group GP2. The number of multiple groups is, for example, not less than 2 and not more than 100, e.g., about 20.

This value is an example; and the number of groups in the embodiment is arbitrary. As described below, a non-display operation is performed between the scanning of the two groups.

The first group GP1 includes a portion of the multiple first interconnects L1 (e.g., an (i−2)th gate line GL(i−2), an (i−1)th gate line GL(i−1), etc., where i is an integer not less than 3).

The second group GP2 is disposed to be adjacent to the first group GP1 in the second direction. The second group GP2 includes another portion of the multiple first interconnects L1 (e.g., an ith gate line GU, an (i+1)th gate line GL(i+1), etc.).

The multiple second interconnects L2 (the signal lines SL) include a first color interconnect SLa. The first color interconnect SLa is the signal line SL that corresponds to a first color. The first color is, for example, at least one of red (R), green (G), or blue (B). In the example, the first color is blue. The first color interconnect SLa is, for example, the signal line SL that corresponds (is connected) to the blue pixel.

The multiple switch elements 11 include multiple first switches SW1 and multiple second switches SW2.

Each of the first switches SW1 is electrically connected to the first color interconnect SLa and one of the first interconnects L1 belonging to the first group GP1 without duplication between the first switches SW1.

Each of the second switches SW2 is electrically connected to the first color interconnect SLa and one of the first interconnects L1 belonging to the second group GP2 without duplication between the second switches SW2.

The multiple pixel electrodes Px include multiple first pixel electrodes Px1 and multiple pixel electrodes Px2.

Each of the first pixel electrodes Px1 is electrically connected to one of the multiple first switches SW1 without duplication between the first pixel electrodes Px1.

Each of the second pixel electrodes Px2 is electrically connected to one of the multiple second switches SW2 without duplication between the second pixel electrodes Px2.

The multiple third interconnects L3 (the common lines CL) include a first counter interconnect CLa. As described below, the first counter interconnect CLa, the multiple first pixel electrodes Px1, and the multiple second pixel electrodes Px2 overlap when projected onto the X-Y plane (a plane including the first direction D1 and the second direction D2).

The multiple second interconnects L2 (the signal lines SL) further include a second color interconnect SLb. The second color interconnect SLb is the signal line SL that corresponds to a second color. The second color is different from the first color and is, for example, one of red, green, or blue. In the example, the second color is red. The second color interconnect SLb is disposed to be adjacent to the first color interconnect SLa in the first direction D1. As described below, a slit (a gap) is provided between the first color interconnect SLa and the second color interconnect SLb. The first color interconnect SLa is separated from the second color interconnect SLb by the slit.

The multiple switch elements 11 further include multiple third switches SW3 and multiple fourth switches SW4.

Each of the third switches SW3 is electrically connected to the second color interconnect SLb and one of the first interconnects L1 belonging to the first group GP1 without duplication between the third switches SW3.

Each of the fourth switches SW4 is electrically connected to the second color interconnect SLb and one of the first interconnects L1 belonging to the second group GP2 without duplication between the fourth switches SW4.

The multiple pixel electrodes Px include the multiple third pixel electrodes Px3 and multiple fourth pixel electrodes Px4.

The third pixel electrodes Px3 are electrically connected respectively to the multiple third switches SW3 without duplication between the third pixel electrodes Px3.

The fourth pixel electrodes Px4 are electrically connected respectively to the multiple fourth switches SW4 without duplication between the fourth pixel electrodes Px4.

In the example, the multiple second interconnects L2 (the signal lines SL) further include a third color interconnect SLc. The third color interconnect SLc is the signal line SL that corresponds (is connected) to a third color. The third color is different from the first color and different from the second color. The third color is, for example, one of red, green, or blue. In the example, the third color is green. The third color interconnect SLc is, for example, the signal line SL that corresponds (is connected) to the green pixel. The third color interconnect SLc is disposed to be adjacent to the first color interconnect SLa in the first direction D1. For example, the first color interconnect SLa is disposed between the second color interconnect SLb and the third color interconnect SLc.

The multiple switch elements 11 further include multiple fifth switches SW5 and multiple sixth switches SW6.

Each of the multiple fifth switches SW5 is electrically connected to the third color interconnect SLc and one of the first interconnects L1 belonging to the first group GP1 without duplication between the multiple fifth switches SW5.

Each of the multiple sixth switches SW6 is electrically connected to the third color interconnect SLc and one of the first interconnects L1 belonging to the second group GP2 without duplication between the multiple sixth switches SW6.

The multiple pixel electrodes Px further include multiple fifth pixel electrodes Px5 and multiple sixth pixel electrodes Px6.

The fifth pixel electrodes Px5 are electrically connected respectively to the multiple fifth switches SW5 without duplication between the fifth pixel electrodes Px5.

The sixth pixel electrodes Px6 are electrically connected respectively to the multiple sixth switches SW6 without duplication between the sixth pixel electrodes Px6.

As illustrated in FIG. 2, for example, the multiple pixels 35 include a first color pixel 35a, a second color pixel 35b, and a third color pixel 35c. In the embodiment, modifications of the combinations of the multiple colors are possible. Four or more pixels 35 may be provided. An example is described hereinbelow in which three pixels 35 are provided.

Figure 3:
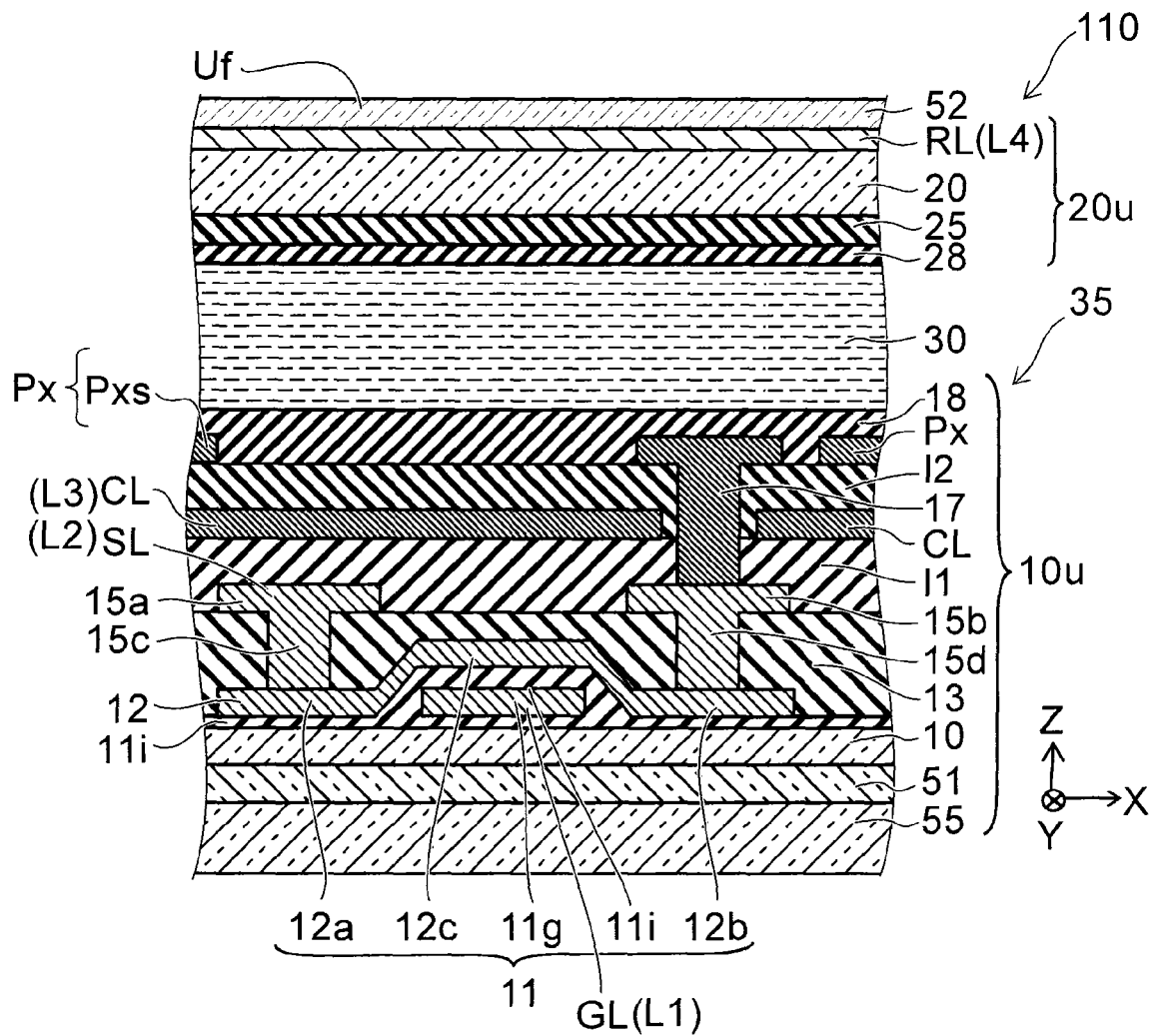
FIG. 3 is a schematic cross-sectional view illustrating the display device according to the first embodiment.

FIG. 3 is a schematic cross-sectional view illustrating the display device according to the first embodiment.

As shown in FIG. 3, a first substrate unit 10u, a second substrate unit 20u, and the display layer 30 are provided in the display device 110. The multiple pixels 35 are provided in the display device 110. FIG. 3 illustrates a portion of one pixel 35.

A first substrate 10, the gate lines GL (the first interconnects L1), the switch elements 11, the signal lines SL (the second interconnects L2), the common lines CL (the third interconnects L3), and the pixel electrodes Px are provided in the first substrate unit 10u.

The gate line GL and the signal line SL are provided at the upper surface of the first substrate unit 10u to extend in the X-Y direction. In the example, the first substrate 10 is light-transmissive. A TFT is used as the switch element 11.

The switch element 11 includes the semiconductor layer 12. The semiconductor layer 12 includes the first portion 12a (e.g., the source), the second portion 12b (e.g., the drain), and a third portion 12c (e.g., the channel). The third portion 12c is disposed between the first portion 12a and the second portion 12b. The switch element 11 further includes the gate 11g and a gate insulator film 11i. The gate insulator film 11i is provided between the third portion 12c and the gate 11g. In the example, a portion (a first connection portion 15a) of the signal line SL is electrically connected to the first portion 12a. The first connection portion 15a is electrically connected to the first portion 12a by a first connecting conductive portion 15c. On the other hand, a second connecting conductive portion 15d is provided on the second portion 12b. A second connection portion 15b is provided on the second connecting conductive portion 15d.

An inter-layer insulating layer 13 is provided between the first connection portion 15a (the signal lines SL) and the semiconductor layer 12, between the first connecting conductive portion 15c and the semiconductor layer 12, between the second connection portion 15b and the semiconductor layer 12, and between the second connecting conductive portion 15d and the semiconductor layer 12.

In the example, the common lines CL are provided on the second metal layer of the signal lines SL, etc. A first insulating layer I1 is provided between the common lines CL and the signal lines SL. The first insulating layer I1 is provided between the multiple signal lines SL and the multiple common lines CL.

The pixel electrode Px is provided on the common lines CL. In the example, the pixel electrode Px includes one or multiple portions Pxs having band configurations. The multiple portions Pxs are separated from each other in the X-Y plane. In the example, the pixel electrode Px is electrically connected to the second connection portion 15b by a third connecting conductive portion 17.

The common lines CL and the pixel electrode Px include conductive layers that are light-transmissive. In the embodiment, ITO (Indium Tin Oxide) is used. A second insulating layer 12 is provided between the pixel electrode Px and the common lines CL. The thickness of the second insulating layer 12 is sufficiently smaller than the thickness of the liquid crystal layer. Also, other lateral electric field modes such as IPS (In Plane Switching), etc., vertical electric field modes such as VA (Vertical Alignment), TN (Twisted Nematic), ECB (Electrically Controlled Birefringence), etc., may be employed.

A first alignment film 18 is provided on the pixel electrode Px in the example.

The second substrate unit 20u is separated from the first substrate unit 10u in the Z-axis direction. In the example, the second substrate unit 20u includes a second substrate 20, a color filter layer 25, a second alignment film 28, and the sense lines RL (the fourth interconnects L4). The sense lines RL are separated from the switch elements 11 and the multiple pixel electrodes Px.

In the example, the second substrate 20 is light-transmissive. The sense lines RL are light-transmissive. Although transmissive conductive films made of ITO are employed as the sense lines RL in the embodiment, it is also possible to employ wires made of metal as the sense lines RL. The color filter layer 25 includes a red colored layer, a green colored layer, and a blue colored layer. The red colored layer, the green colored layer, and the blue colored layer are disposed to correspond respectively to the multiple pixels 35. Four or more colors of the color filter layer 25 may be used.

The display layer 30 that is made of a liquid crystal layer including multiple liquid crystal molecules is provided between the first substrate unit 10u and the second substrate unit 20u.

A first polarizing layer 51 and a second polarizing layer are provided with the pair of substrates 10 and 20 interposed. A backlight unit 55 is provided to oppose the first polarizing layer 51.

In the example, the pixel electrode Px includes the multiple portions Pxs having the band configurations. By applying a signal to the pixel electrode Px, a "fringe electric field" is generated between the pixel electrode Px and the common line CL. The alignment of the director (the long axis) of the liquid crystal molecules of the display layer 30 (the liquid crystal layer) changes in the X-Y plane due to the fringe electric field. At least one of the birefringence or the optical rotatory properties of the display layer 30 at the location changes due to the change of the alignment of the director.

The transmittance of the pixel for the light emitted from the backlight unit 55 changes due to the change of the optical characteristic of the display layer 30. In other words, the transmittance of the pixel for the light changes according to the electrical signal (the image signal) applied to the pixel electrode Px. Then, the light having the changed brightness passes through the display layer 30 and is emitted from an upper surface Uf of the display device 110. Thereby, the display is performed.

On the other hand, the touch input to the upper surface Uf of the display device 110 is sensed by the multiple sense lines RL and the multiple common lines CL. In the sense operation, a finger of the viewer (the user) of the liquid crystal display device 110, an input member (an input pen), etc., contacts or is proximal to the liquid crystal display device 110. The electrical capacitance that is created by the sense lines RL and the common lines CL changes due to the contact or proximity recited above. The touch input is sensed by sensing the change of the electrical capacitance.

Figure 4A:
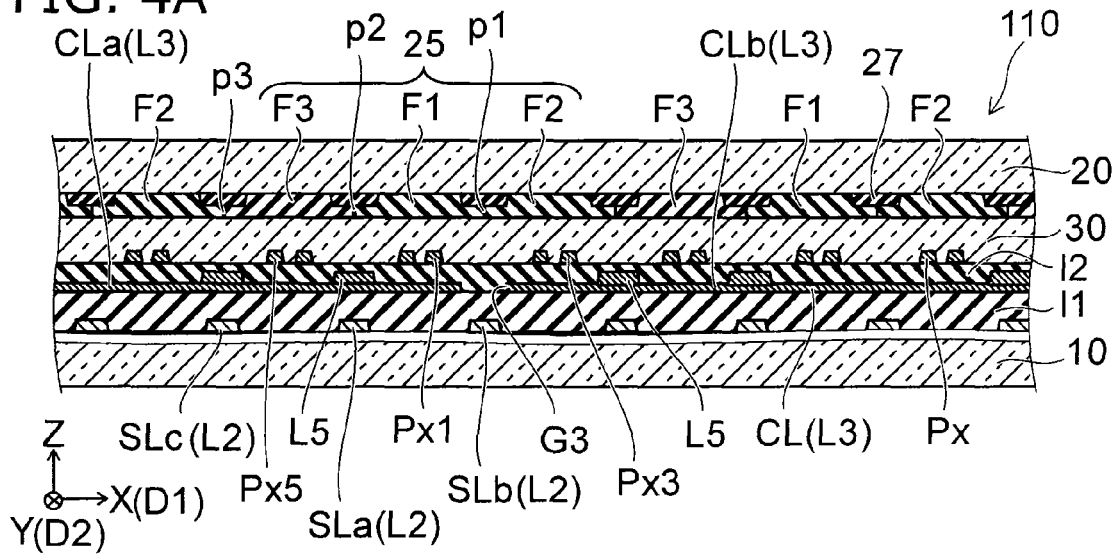
FIG. 4A and FIG. 4B are schematic cross-sectional views illustrating the display device according to the first embodiment.
Figure 4B:
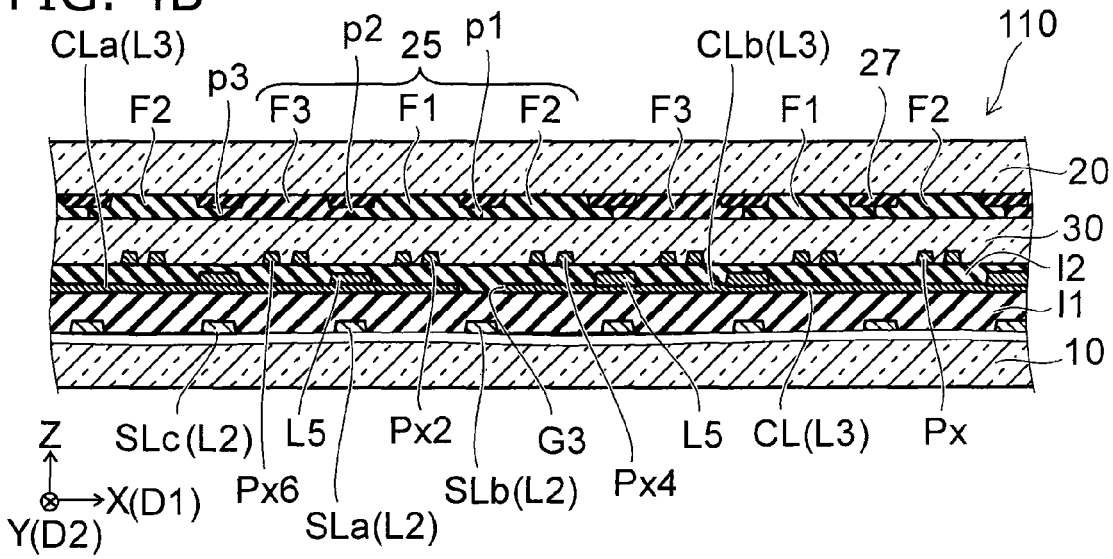

FIG. 4A and FIG. 4B are schematic cross-sectional views illustrating the display device according to the first embodiment.

These drawings are cross-sectional views in which the display device is cut in the X-Z plane. FIG. 4A is a cross-sectional view at a position corresponding to the first group GP1. FIG. 4B is a cross-sectional view at a position corresponding to the second group GP2. The sense lines RL are not shown in these drawings.

The color filter layer 25 is provided in the display device 110 as shown in FIG. 4A and FIG. 4B. In the example, the color filter layer 25 is provided in the second substrate unit 20u. In the embodiment, the position of the color filter layer 25 in the Z-axis direction is arbitrary. For example, the color filter layer 25 may be provided in the first substrate unit 10u.

The color filter layer 25 further includes multiple first color filters F1 of the first color, multiple second color filters F2 of the second color, and third color filters F3 of the third color.

Each of the color filters F1 to F3 is provided to extend in the pixel column direction; the second color filter F2 is provided on one side of the first color filter F1; the third color filter F3 is provided on the other side of the first color filter F1; and the combination of the first to third color filters F1 to F3 is arranged in the second direction D2. The color filters F1 to F3 respectively oppose the pixel columns of the pixel electrodes Px of the first substrate unit 10u with the display layer 30 interposed. In other words, as shown in FIG. 4A, the multiple first color filters F1 and the multiple first pixel electrodes Px1 overlap when projected onto the X-Y plane. As shown in FIG. 4B, the multiple first color filters F1 and the multiple second pixel electrodes Px2 overlap when projected onto the X-Y plane.

As shown in FIG. 4A, the multiple third pixel electrodes Px3 and at least a portion of the multiple second color filters F2 overlap when projected onto the X-Y plane. As shown in FIG. 4B, the multiple fourth pixel electrodes Px4 and at least a portion of the multiple second color filters F2 overlap when projected onto the X-Y plane.

As shown in FIG. 4A, the multiple fifth pixel electrodes Px5 and at least a portion of the multiple third color filters F3 overlap when projected onto the X-Y plane. As shown in FIG. 4B, the multiple sixth pixel electrodes Px6 and at least a portion of the multiple second color filters F2 overlap when projected onto the X-Y plane.

The first to third color filters F1 to F3 are provided repeatedly along the first direction D1.

The controller 60 supplies color image signals to the color interconnects SLa to SLc; thereby, the pixel electrode potentials are controlled; and the optical operations of the display layer 30 are performed. The desired display having the desired colors is performed by implementing these operations.

The visibility of the second color is higher than the visibility of the first color. The visibility of the third color is higher than the visibility of the first color. The third color is different from the second color. In the embodiment, blue is employed as the first color; red is employed as the second color; and green is employed as the third color.

The color filter layer 25 includes a first boundary portion p1, a second boundary portion p2, and a third boundary portion p3. A light-shielding layer 27 (e.g., a black matrix) is provided so that the light-shielding layer 27, the first boundary portion p1, the second boundary portion p2, and the third boundary portion p3 overlap.

As shown in FIG. 4A and FIG. 4B, for example, a gap G3 (a slit) is provided between the mutually-adjacent third interconnects L3 (the common lines CL). The slit extends in the second direction D2.

The gap G3 and at least one of the first boundary portion p1, the second boundary portion p2, or the third boundary portion p3 overlap when projected onto the X-Y plane. In the embodiment, the gap G3 and the region (e.g., the first boundary portion p1) between the pixel column including the first pixel electrodes Px1 and the second pixel electrodes Px2 of the first color and the pixel column including the third pixel electrodes Px3 and the fourth pixel electrodes Px4 of the second color overlap.

The gap G3 and the region (e.g., the third boundary portion p3) between the first pixel electrodes Px1 of the first color and the third pixel electrodes Px3 of the second color may overlap when projected onto the X-Y plane.

In other words, as shown in FIG. 4A and FIG. 4B, the multiple first pixel electrodes Px1, the second pixel electrodes Px2, the multiple fifth pixel electrodes Px5, the multiple sixth pixel electrodes Px6, and the first counter interconnect CLa that is included in the multiple third interconnects L3 overlap when projected onto the X-Y plane. As shown in FIG. 4A and FIG. 4B, the multiple third pixel electrodes Px3, the fourth pixel electrodes Px4, and a second counter interconnect CLb that is included in the multiple third interconnects L3 overlap when projected onto the X-Y plane. The first counter interconnect CLa is, for example, the jth common interconnect CLj (j being an integer not less than 1). The second counter interconnect CLb is, for example, the (j+1)th common interconnect CL(j+1).

Multiple fifth interconnects L5 are further provided in the example. Each of the multiple fifth interconnects L5 extends in the second direction D2. The multiple fifth interconnects L5 are provided on the multiple third interconnects L3. The electrical resistance of each of the multiple fifth interconnects L5 is lower than the electrical resistance of each of the multiple third interconnects L3. The fifth interconnects L5 are used as supplemental interconnects of the third interconnects L3.

As described above, a conductive material that is light-transmissive is used as the third interconnect L3. On the other hand, the fifth interconnect L5 includes a material (a metal, etc.) that has a low resistance. Thereby, the effective resistance of the third interconnect L3 can be reduced. The occurrence of crosstalk can be suppressed.

The multiple fifth interconnects L5 and the multiple second interconnects L2 overlap when projected onto the X-Y plane. In the example, the multiple fifth interconnects L5 and the second boundary portions p2 or the multiple fifth interconnects L5 and the third boundary portions p3 overlap when projected onto the X-Y plane.

Examples of operations of the display device 110 will now be described. In the following example, the display operation and the sense operation of the touch input of the display device 110 are performed.

Figure 5:
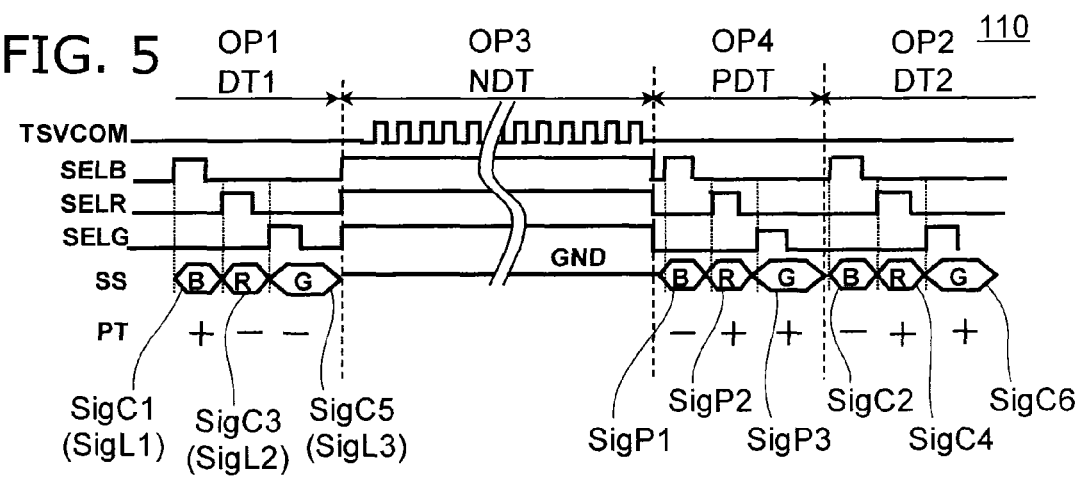
FIG. 5 is a schematic view illustrating the operations of the display device according to the first embodiment.

FIG. 5 is a schematic view illustrating the operations of the display device according to the first embodiment.

FIG. 5 is a time chart illustrating the operations of the display device 110. The horizontal axis of FIG. 5 is time. A sense signal TSVCOM, selector signals SELR, SELG, and SELB, and a source signal SS are shown in FIG. 5. In the sense operation, the sense signal TSVCOM is an AC signal (an alternating current signal) supplied to the common lines CL. A red signal line selector, a green signal line selector, and a blue signal line selector (not shown) are provided in the second drive circuit 62. These selectors are electrically connected to the signal lines SL; and by sequentially supplying the selector signals to the selectors, the signal lines to which the signals of each of the colors are supplied and the signal lines of each of the colors are sequentially switched ON/OFF by time-division; and thereby, the signals of the colors are supplied to each of the signal lines. The selector signals SELR, SELG, and SELB are the signals supplied to the red signal line selector, the green signal line selector, and the blue signal line selector, respectively. The source signal SS is the signal supplied to the signal lines SL. These signals are supplied by the controller 60. A polarity PT of the source signal SS is illustrated in FIG. 5. In the embodiment, the polarity PT is the signal of the source signal SS when the potential of the common lines CL is used as a reference. It is also possible to employ a configuration in which the ground potential is used as the reference of the polarity PT.

As shown in FIG. 5, a first display interval DT1, a second display interval DT2, and a non-display interval NDT are provided inside one frame interval. The second display interval DT2 is the display interval after the first display interval DT1. The non-display interval NDT is the interval between the first display interval DT1 and the second display interval DT2. A pre-display interval PDT is further provided in the example. The pre-display interval PDT is provided in the latter-stage portion of the non-display interval NDT. Or, the pre-display interval PDT may be considered to be an interval between the non-display interval NDT and the second display interval DT2.

The display intervals DT and the non-display interval NDT are provided alternately inside the one frame interval; scanning is performed by the gate signals proceeding from the first pixel row toward the nth pixel row; and sequential transitioning is performed between the groups of the pixel rows for the touch sensing and the display in each of the display intervals.

The controller 60 implements a first operation OP1 in the first display interval DT1. In the first operation OP1, the display at the pixels 35 corresponding to the first group GP1 is performed. In other words, the information for the display is written to the pixels 35 corresponding to the first group GP1.

The controller 60 implements a second operation OP2 in the second display interval DT2. In the second operation OP2, the display at the pixels 35 corresponding to the second group GP2 is performed. In other words, the information for the display is written to the pixels 35 corresponding to the second group GP2.

In the non-display interval NDT, the controller 60 performs a third operation OP3 that is different from the first operation OP1 and the second operation OP2.

In the pre-display interval PDT, the controller 60 performs a fourth operation OP4. The fourth operation OP4 is described below.

In the third operation OP3, for example, the controller 60 supplies an alternating current signal as the sense signal TSVCOM to the common lines CL. For the alternating current signal, a high voltage and a low voltage that is lower than the high voltage are repeated. The alternating current signal includes, for example, multiple pulses. Capacitance is created between the common lines CL and the sense lines RL by the signal; and the touch sensing is performed by sensing the capacitance and the change of the capacitance. In other words, in the third operation OP3, the controller 60 senses the capacitance between the common lines CL and the sense lines RL and senses the change of a current based on the change of the capacitance between the sense lines RL and the common lines CL due to an object (a viewer, a user, an operator, etc.) proximal to one of the sense lines RL. In the third operation OP3, the selector signals are in the low state (the unselected state); and the source signal SS is, for example, a ground potential GND.

In the first operation OP1 and the second operation OP2, the selector signals are sequentially set to the high state (the selected state); and the image signal that corresponds to the desired image data is supplied as the source signal SS. At this time, in the embodiment, the polarity PT of the source signal SS corresponding to blue is positive in the first operation OP1. The polarity PT of the source signal SS corresponding to red is negative in the first operation OP1. The polarity PT of the source signal SS corresponding to green is negative in the first operation OP1. In the second operation OP2, the polarity PT of the source signal SS corresponding to blue is negative. In the second operation OP2, the polarity PT of the source signal SS corresponding to red is positive. In the second operation OP2, the polarity PT of the source signal SS corresponding to green is positive. Thus, in the embodiment, the polarity PT is inverted.

Examples of the first operation OP1 and the second operation OP2 will now be described further.

Figure 6:
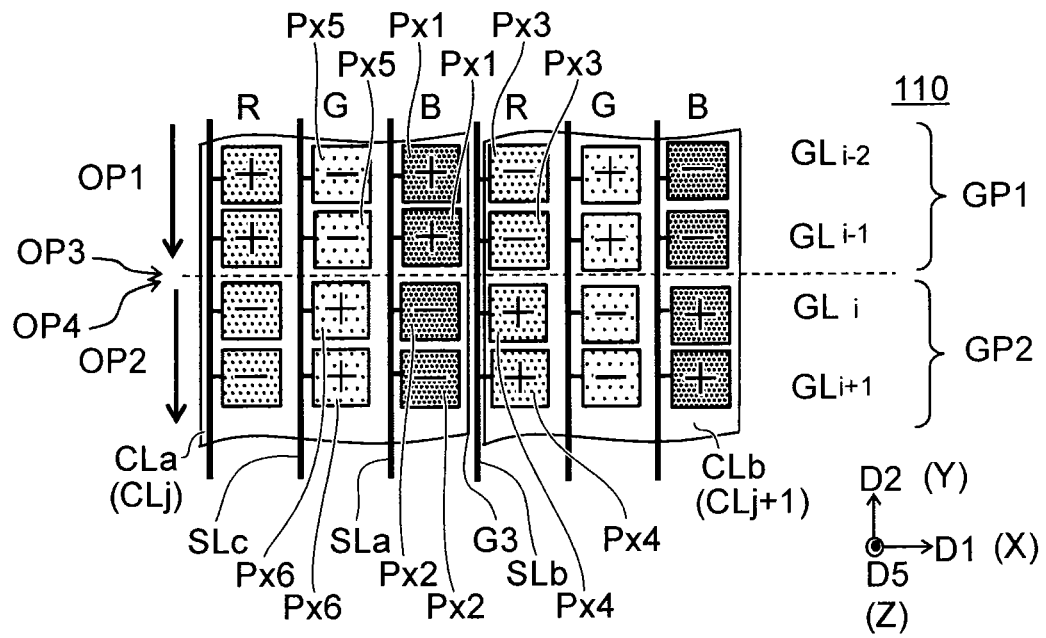
FIG. 6 is a schematic view illustrating the operations of the display device according to the first embodiment.

FIG. 6 is a schematic view illustrating the operations of the display device according to the first embodiment.

FIG. 6 illustrates the polarities of the signals of the display device 110.

As shown in FIG. 6, for the first group GP1, the first operation OP1 (the first display operation) is performed; and subsequently, the third operation OP3 (the non-display operation) is performed. Subsequently, the second operation OP2 (the second display operation) is performed for the second group GP2. The fourth operation OP4 described below may be implemented inside the third operation OP3.

In the first operation OP1, the controller 60 sequentially selects the gate lines GL of the pixels belonging to the first group GP1 in the direction toward the second group GP2 (the first display interval DT1 being the interval in which the gate lines GL of the pixel rows belonging to the first group GP1 are selected) and sequentially selects the multiple first interconnects L1 included in the first group GP1 (referring to FIG. 2). Here, the controller 60 supplies a first color image signal SigC1 (referring to FIG. 5) to the first color interconnect SLa. The first color image signal SigC1 has the first polarity having the potential of the first counter interconnect CLa as the reference. In the example of FIG. 6, the first polarity is positive ("+").

Similarly, in the first display interval DT1, the controller 60 further supplies a third color image signal SigC3 (referring to FIG. 5) of the second polarity (in the embodiment, negative) to the second color interconnect SLb.

The second polarity is reverse to the first polarity having the potential of the first counter interconnect CLa as the reference. In the example, the second polarity is negative ("−"). For example, the first polarity and the second polarity are interchanged every frame period.

Similarly, in the first display interval DT1, the controller 60 further supplies a fifth color image signal SigC5 (referring to FIG. 5) of the second polarity (in the embodiment, negative) to the third color interconnect SLc.

In the second operation OP2, the controller 60 sequentially selects the gate lines GL of the pixels belonging to the second group GP2 in the direction away from the first group GP1 (the second display interval DT2 being the interval in which the gate lines GL of the pixel rows belonging to the second group GP2 are selected) and sequentially selects the multiple first interconnects L1 included in the second group GP2 (referring to FIG. 2). A second color image signal SigC2 (referring to FIG. 5) is supplied to the first color interconnect SLa. The second color image signal SigC2 has the second polarity.

In the second display interval DT2, the controller 60 further supplies a fourth color image signal SigC4 (referring to FIG. 5) of the first polarity (e.g., positive) to the second color interconnect SLb.

In the second display interval DT2, the controller 60 further supplies a sixth color image signal SigC6 (referring to FIG. 5) of the first polarity to the third color interconnect SLc.

Elaborating on the state of the signal supply for the display interval for each pixel column, for one frame interval, the first color image signal SigC1 of the positive polarity is supplied to the blue pixels (the first pixel electrodes Px1) corresponding to the first group GP1 in the first operation OP1. After the first operation OP1, the third operation OP3 of the non-display operation is performed. Then, in the second operation OP2 after the third operation OP3, the second color image signal SigC2 of the negative polarity is supplied to the blue pixels (the second pixel electrodes Px2) corresponding to the second group GP2. Thus, in the embodiment, the polarities of the signals supplied to the pixels 35 are inverted between the display operations before and after the non-display operation.

Similarly, the third color image signal SigC3 of the negative polarity is supplied to the red pixels (the third pixel electrodes Px3) corresponding to the first group GP1. In the second operation OP2, the fourth color image signal SigC4 of the positive polarity is supplied to the red pixels (the fourth pixel electrodes Px4) corresponding to the second group GP2.

Similarly, the fifth color image signal SigC5 of the negative polarity is supplied to the green pixels (the fifth pixel electrodes Px5) corresponding to the first group GP1. In the second operation OP2, the sixth color image signal SigC6 of the positive polarity is supplied to the green pixels (the sixth pixel electrodes Px6) corresponding to the second group GP2.

In other words, for the pixels belonging to the first group GP1, the polarity (the polarity when the common lines CL are used as the reference) of the image signal changes alternately along the first direction D1 (the X-axis direction). In other words, for the driving state of the pixels belonging to the first group GP1, V line inversion (column inversion) driving is performed for the first group GP1.

Similarly, for the pixels belonging to the second group GP2 as well, the polarity (the polarity when the common lines CL are used as the reference) of the image signal changes alternately along the first direction D1 (the X-axis direction). For the driving state of the pixels belonging to the second group GP2, V line inversion (column inversion) driving is performed for the second group GP2.

In the embodiment, the polarity of the region corresponding to the first group GP1 and the polarity of the region corresponding to the second group GP2 are interchanged for all colors. Thus, the driving that is column inversion driving in which the polarity is further inverted in the non-display interval (the blanking interval) which is not a display interval is called, for example, "split V line inversion" driving.

It can be said that in the split V line driving, the controller 60 further supplies pixel signals of inverted polarities between the group (in the embodiment, the first group GP1) of the pixel electrodes of the first pixel rows to which the pixel signals are applied in the first display interval DT1 and the group (in the embodiment, the second group GP2) of the second pixel rows arranged with the first pixel rows and to which the pixel signals are applied in the second display interval DT2 after the first display interval in the state where pixel signals of mutually-inverted polarities between the mutually-adjacent pixel columns are supplied to the prescribed pixel electrodes Px.

Figure 7:
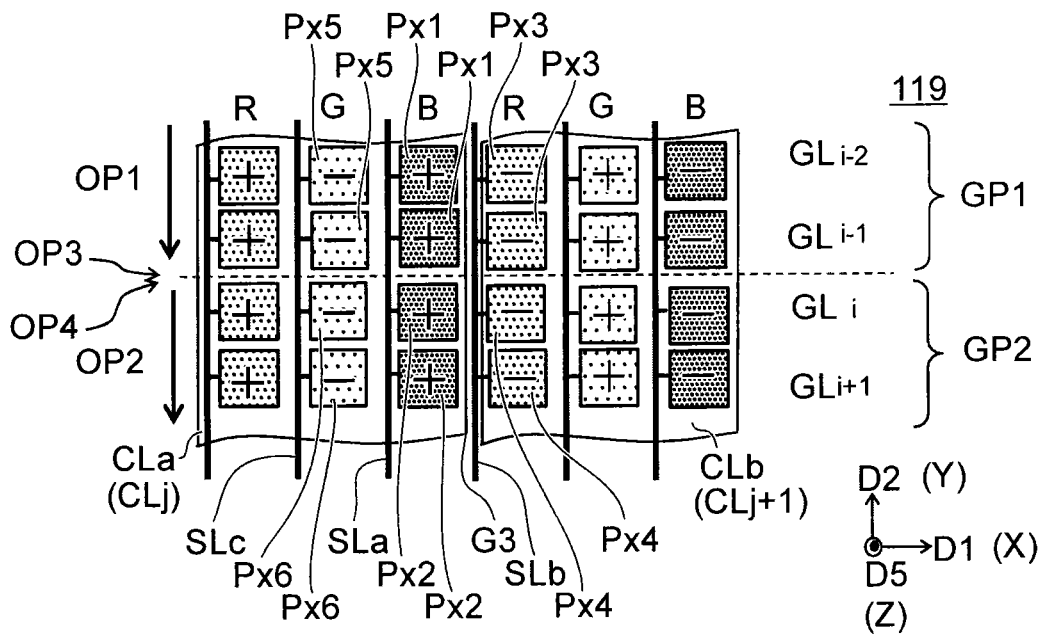
FIG. 7 is a schematic view illustrating operations of a display device of a reference example.

FIG. 7 is a schematic view illustrating operations of a display device of a reference example.

FIG. 7 illustrates the polarities of the signals of the display device 119 of the reference example. The configurations of the first substrate unit 10u and the second substrate unit 20u of the display device 119 are the same as those of the display device 110. The operations of the display device 119 are different from the operations of the display device 110. The operations of the display device 119 will now be described.

In the display device 119 as shown in FIG. 7, the polarities of the signals supplied to the pixel electrodes are the same between the first operation OP1 and the second operation OP2 for the pixels of each color. In other words, in the display device 119, V line inversion (column inversion) driving is performed for both the first group GP1 and the second group GP2. The polarities in the region corresponding to the first group GP1 are the same as the polarities in the region corresponding to the second group GP2.

According to experiments of the inventor, it was discovered that when the driving for the first display interval DT1, the non-display interval NDT, and the second display interval DT2 is performed in the display device 119, a slight nonuniformity of the display occurs; but on the other hand, in the display device 110 according to the embodiment, it was found that a display that is more uniform than that of the display device 119 is obtained even in the case where the non-display operation (the third operation OP3) is performed. In other words, a high-quality display is obtained in the display device 110 according to the embodiment.

An example of the nonuniformity of the display occurring in the display device 119 will now be described.

Figure 8A:
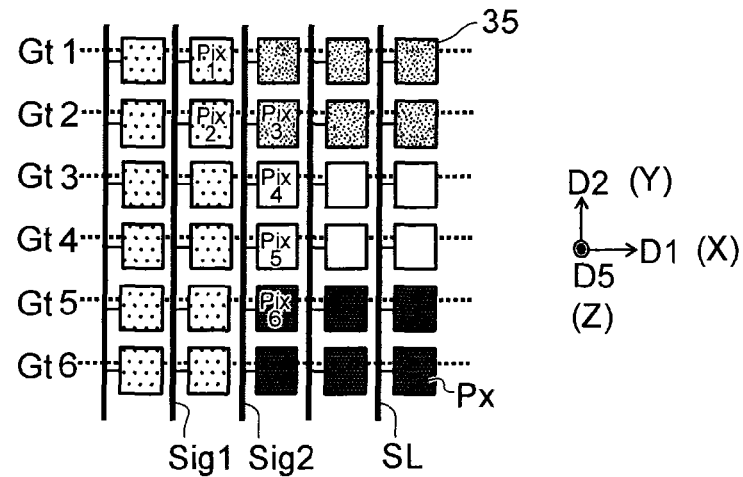
FIG. 8A to FIG. 8C are schematic views illustrating characteristics of the display device.
Figure 8B:
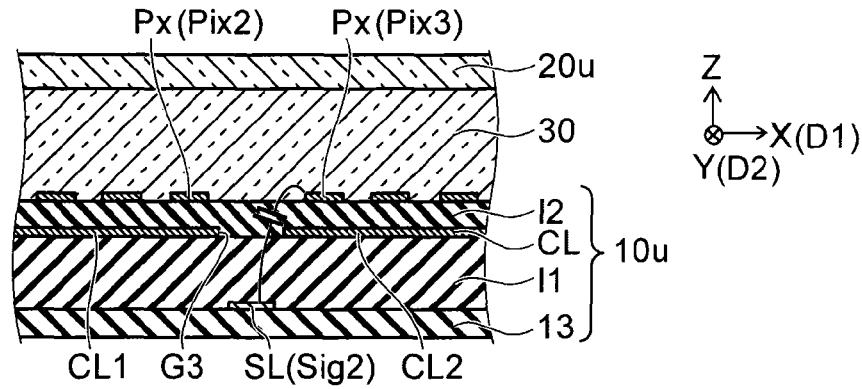
Figure 8C:
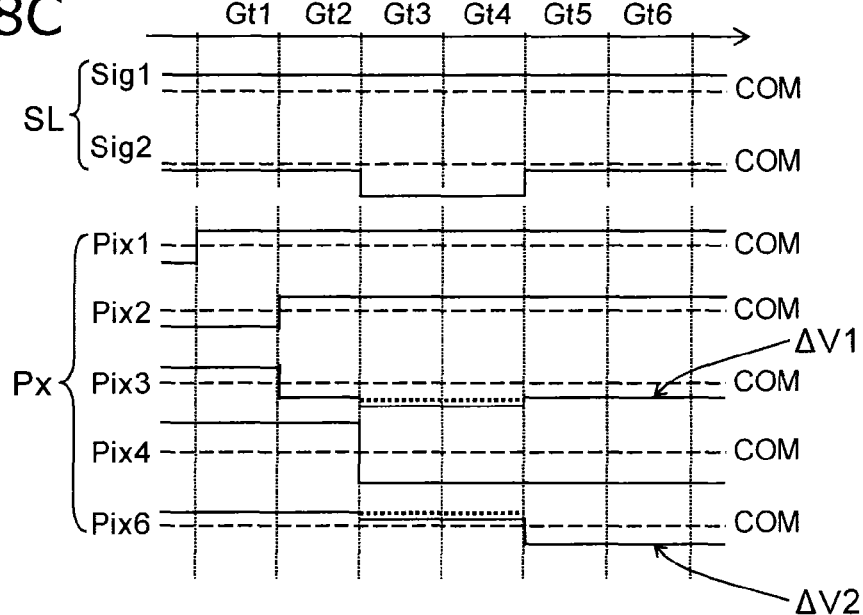

FIG. 8A to FIG. 8C are schematic views illustrating characteristics of the display device.

FIG. 8A illustrates the nonuniformity of the display occurring in the display device 119. FIG. 8B is a cross-sectional view of a region of a portion of the display device 119. FIG. 8C illustrates the potentials of the display device 119.

As illustrated in FIG. 8A, first to sixth gate lines Gt1 to Gt6 and the multiple signal lines SL are provided. An example will now be described in which signals of the positive polarity are written to the pixel electrodes Px by column inversion driving. The switch elements 11 are not shown in FIG. 8A. A first signal line Sig1 and a second signal line Sig2 of the signal lines SL are focused upon.

As illustrated in FIG. 8A, a pixel electrode Pix1 is provided at the intersecting position between the first gate line Gt1 and the first signal line Sig1. A pixel electrode Pix2 is provided at the intersecting position between the second gate line Gt2 and the first signal line Sig1. A pixel electrode Pix3 is provided at the intersecting position between the second gate line Gt2 and the second signal line Sig2. A pixel electrode Pix4 is provided at the intersecting position between the third gate line Gt3 and the second signal line Sig2. A pixel electrode Pix5 is provided at the intersecting position between the fourth gate line Gt4 and the second signal line Sig2. A pixel electrode Pix6 is provided at the intersecting position between the fifth gate line Gt5 and the second signal line Sig2.

In the example as illustrated in FIG. 8B, the gap G3 of the common lines CL is disposed in the region between the pixel electrode Pix2 and the pixel electrode Pix3. In other words, the first common line CL1 and the pixel electrode Pix2 overlap when projected onto the X-Y plane. The second common line CL2 and the pixel electrode Pix3 overlap when projected onto the X-Y plane. The gap G3 and the signal line SL (in the example, the second signal line Sig2) overlap when projected onto the X-Y plane.

As illustrated in FIG. 8A, signals for the display having the same gradation (a first gradation) are supplied to the pixel electrodes Px (e.g., the pixel electrode Pix1, the second pixel electrode Pix2, etc.) corresponding to the first signal line Sig1. The signal for the display having the first gradation is supplied to the pixel electrode Pix3 and the pixel electrode Pix6. A signal for the display having a second gradation is supplied to the pixel electrode Pix4 and the pixel electrode Pix5. For example, the magnitude of the signal for the display having the second gradation is greater than the magnitude of the signal for the display having the first gradation. A dark display (normally dark) is performed when the potential difference between the pixel electrode Px and the counter electrode (the common interconnect CL) is small. The brightness of the second gradation is brighter than the brightness of the first gradation.

When such a display is performed, for example, it was found that there are cases where the brightness of the pixel 35 corresponding to the pixel electrode Pix3 is brighter than the brightness (the first gradation) that should be displayed; and the brightness of the pixel 35 corresponding to the pixel electrode Pix6 is darker than the brightness (the first gradation) that should be displayed. In other words, a nonuniformity of the display occurs. In other words, vertical crosstalk occurs.

According to the investigations of the inventor, it is inferred that capacitance is created between the pixel electrodes Px and the signal lines SL; and the nonuniformity is caused by the potentials of the pixel electrodes Px fluctuating due to the capacitance.

FIG. 8C illustrates the potentials of the signal lines SL and the potentials of the pixel electrodes Px. The horizontal axis of FIG. 8C is time. Common potentials COM of the common lines CL are displayed in FIG. 8C.

As illustrated in FIG. 8C, the potential of the first signal line Sig1 corresponds to the first gradation. On the other hand, the potential of the second signal line Sig2 is a potential corresponding to the second gradation (a potential higher than the first gradation) when the third gate line Gt3 and the fourth gate line Gt4 are selected. Because of the state of the column inversion driving, the polarities are inverted between Sig1 and Sig2.

As illustrated in FIG. 8C, the pixel electrodes Pix1 and Pix2 are set to the desired potentials. Conversely, after the desired potential of the first gradation is written to the pixel electrode Pix3, the potential fluctuates to become a potential that is lower than the prescribed potential (the potential of the second gradation) in the interval in which the third gate line Gt3 and the fourth gate line Gt4 are selected. It is considered that this is caused by the potential of the pixel electrode Pix3 fluctuating to be lower (more distal to the potential of the common interconnect) due to the coupling between the pixel electrode Pix3 and the second signal line Sig2. In other words, potential fluctuation $\Delta V1$ occurs at the pixel electrode Pix3. Therefore, it is considered that the pixel that corresponds to the pixel electrode Pix3 is brighter than the desired brightness.

Conversely, at the pixel electrode Pix6 as illustrated in FIG. 8C, the potential of the pixel electrode Pix6 fluctuates (is pulled toward the negative potential side of the pixel electrodes Pix4 and Pix5) by the coupling of the pixel electrodes Pix4 and Pix5 with the second signal line Sig2 that transmits the signal that should be supplied to the pixel electrode Pix6. Therefore, potential fluctuation $\Delta V2$ occurs at the pixel electrode Pix6. The potential fluctuation $\Delta V2$ is potential fluctuation in the reverse direction of the potential fluctuation $\Delta V1$. Therefore, it is considered the pixel electrode Pix6 is darker than the desired brightness. Thus, in the display device 119, the potentials (the temporal average of the potentials) of the pixel electrodes Px fluctuate due to the capacitive coupling created between the pixel electrodes Px and the signal lines SL; and as a result, the nonuniformity of the display occurs. As illustrated in FIG. 8B, the capacitance occurs mainly in locations where the gap G3 of the common lines CL is provided. In other words, it is considered that the nonuniformity of the display caused by the capacitance is a phenomenon that occurs uniquely in the case where one common line CL is provided for a group of multiple signal lines SL, and more specifically, in the case where the common line CL is disposed parallel to the signal lines SL.

It may be considered to attempt suppressing such a nonuniformity of the display by, for example, using dot inversion driving in which the polarities are inverted by pixel upward, downward, leftward, and rightward or by using line inversion driving in which the polarities are inverted by pixel row arranged in the second direction D2. However, the power consumption increases for these methods.

In the display device 110 according to the embodiment, V line inversion driving is performed for the first group GP1 and the second group GP2; and the potentials of the signal lines SL (the potentials of the pixel electrodes Px) are inverted between the first group GP1 and the second group GP2. By inverting the polarities before and after the non-display interval, the potentials of the signal lines SL before and after the non-display interval are averaged. As a result, the nonuniformity (e.g., the vertical crosstalk) of the display is suppressed. Thereby, a high-quality display can be provided.

Moreover, in the display device 119, it was found that the nonuniformity of the display also occurs due to the capacitance occurring between the pixel electrodes Px and the signal lines SL.

Figure 9:
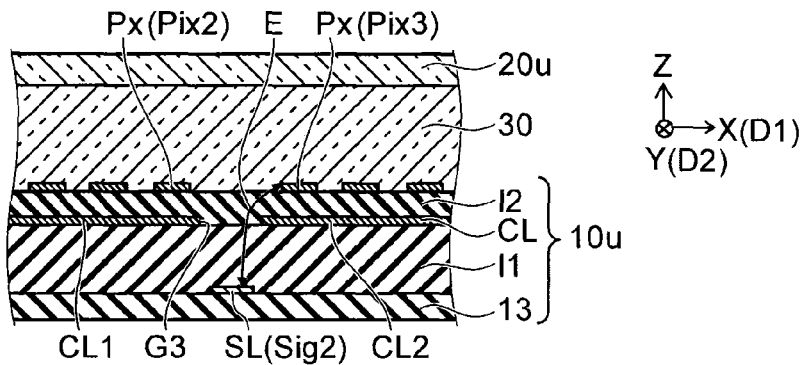
FIG. 9 is a schematic cross-sectional view illustrating characteristics of the display device.

FIG. 9 is a schematic cross-sectional view illustrating characteristics of the display device.

In the display device 119 as shown in FIG. 9, an electric field E is generated by the signal line SL at the position of the gap G3 of the common lines CL. There are cases where the nonuniformity of the display occurs due to the electric field E.

For example, the display of the first gradation is to be performed in one region of a portion of the display surface; and the display of the second gradation is to be performed in one other region. In the display of the first gradation, for example, the potential of the signal line SL is the same as the common potential COM of the common lines CL (e.g., 0 volts). For example, in the display of the second gradation, the potential of the signal line SL is, for example, 5 volts. In such a case, the potential of the signal line SL that performs the display of the second gradation affects the optical operation of the display layer 30. For example, the electric field that is generated between the signal line SL and the pixel electrode Px is applied to the display layer 30. In the case where a liquid crystal is used as the display layer 30, the electric field E affects the liquid crystal. Therefore, for example, light leakage occurs in the portion corresponding to the gap G3.

For example, in the switch element 11, the voltage is split by the source-gate capacitance. Thereby, the potential of the pixel electrode Px after the writing ends is lower than the potential of the signal line SL when writing. The center potential of the signal line SL is higher than the center potential of the pixel electrode Px. The center potential of the signal line SL is higher than the center potential of the common line CL.

For the first group GP1 and for the second group GP2 in the embodiment, V line inversion driving is performed; and the potentials of the signal lines SL (the potentials of the pixel electrodes Px) are inverted between the first group GP1 and the second group GP2. Thereby, the nonuniformity of the display (the light leakage recited above) is suppressed.

Thus, in the display device 110 according to the embodiment, the nonuniformity of the display can be suppressed even in the case where the non-display operation (e.g., an input operation, a display pause, etc.) is performed. As a result, a high-quality display can be provided.

In the display device 110 as illustrated in FIG. 5, the fourth operation OP4 is implemented inside the third operation OP3 (the non-display operation). In the fourth operation OP4, the signals (the pre-charge signals) of the same polarities as the second operation OP2 are supplied to the signal lines SL.

Although the third operation OP3 (the non-display operation) transitions directly to the second operation OP2 (the display operation) in the case where the pre-charge is not performed in the display device 110, at least one of the potential of the signal line SL or the potential of the common line CL is modified abruptly when transitioning between these operations. As a result, capacitance is created between the signal line SL and the common line CL. There are cases where a time delay in the subsequent change of the potential of the signal line SL occurs due to the capacitance. The preparation operation (the pre-charge) for the display is performed in the pre-display interval PDT prior to the second operation OP2 to eliminate such a discrepancy. Thereby, the nonuniformity of the display can be suppressed further without the time delay described above occurring.

In such a case, the polarities of the pre-charge signals are the same polarities as the signals of the second operation OP2. Thereby, the uniformity of the display can be improved.

More specifically, the controller 60 further implements the fourth operation OP4 in the pre-display interval PDT. In the fourth operation OP4, a first color pre-display signal SigP1 (referring to FIG. 5) of the second polarity (e.g., the negative polarity) is supplied to the first color interconnect SLa. Similarly, a second color pre-display signal SigP2 of the first polarity (e.g., the positive polarity) is supplied to the second color interconnect SLb. Similarly, a third color pre-display signal SigP3 of the first polarity (e.g., the positive polarity) is supplied to the third color interconnect SLc.

In such a case, signals corresponding to the final signals supplied (written) may be used as the pre-charge signals in the first operation OP1.

More specifically, the multiple first interconnects L1 included in the first group GP1 include the final first interconnect L1 (referring to FIG. 2, the (i−1)th gate line GL(i−1)) most proximal to the second group GP2). At this time, the controller 60 supplies a first color final signal SigL1 (referring to FIG. 5, the final 1H signal) to the first color interconnect SLa when the final first interconnect L1 (the (i−1)th gate line GL(i−1)) is selected. Then, the first color final signal SigL1 (referring to FIG. 5, the final 1H signal) again is supplied to the first color interconnect SLa at the timing of the fourth operation OP4.

Similarly, a second color final signal SigL2 (referring to FIG. 5, the final 1H signal) is supplied to the second color interconnect SLb when the final first interconnect L1 (the (i−1)th gate line GL(i−1)) is selected. Then, the second color final signal SigL2 (referring to FIG. 5, the final 1H signal) again is supplied to the second color interconnect SLb at the timing of the fourth operation.

Similarly, a third color final signal SigL3 is supplied to the third color interconnect SLc when the final first interconnect L1 (the (i−1)th gate line GL(i−1)) is selected. Then, the third color final signal SigL3 again is supplied to the third color interconnect SLc at the timing of the fourth operation OP4.

The signals that are supplied at the timing of the fourth operation OP4 may have the inverted polarities of the final signals.

In other words, in the driving, it can be said that the controller 60 implements, in the first display interval DT1, the first operation OP1 of sequentially selecting the first interconnects (the gate lines GL) belonging to the first group GP1 and supplying a color image signal Sig of the first polarity having the potential of the third interconnects (the common lines CL) as the reference to each of the color interconnects SLa, SLb, and SLc; the controller 60 implements, in the second display interval DT2, the second operation OP2 of sequentially selecting the first interconnects (the gate lines GL) belonging to the second group GP2 and supplying the color image signal Sig which is a potential of the second polarity which is reverse to the first polarity having the potential of the third interconnects (the common lines CL) as the reference to each of the color interconnects SLa, SLb, and SLc; the controller 60 implements, in the non-display interval NDT, the third operation OP3 which is different from the first operation OP1 and the second operation OP2; and the controller 60 implements, in the pre-display interval PDT which is an interval in the latter stage of the non-display interval NDT, the fourth operation OP4 of supplying the first color pre-display signal SigP1 of the second polarity to the first color interconnect SLa, supplying the second color pre-display signal SigP2 of the first polarity to the second color interconnect SLb, and supplying the third color pre-display signal SigP3 of the first polarity to the third color interconnect SLc.

The nonuniformity of the display can be suppressed further by implementing such a fourth operation OP4 (e.g., the preparation operation for the display, i.e., the pre-charge of the signal lines SL).

Figure 10A:
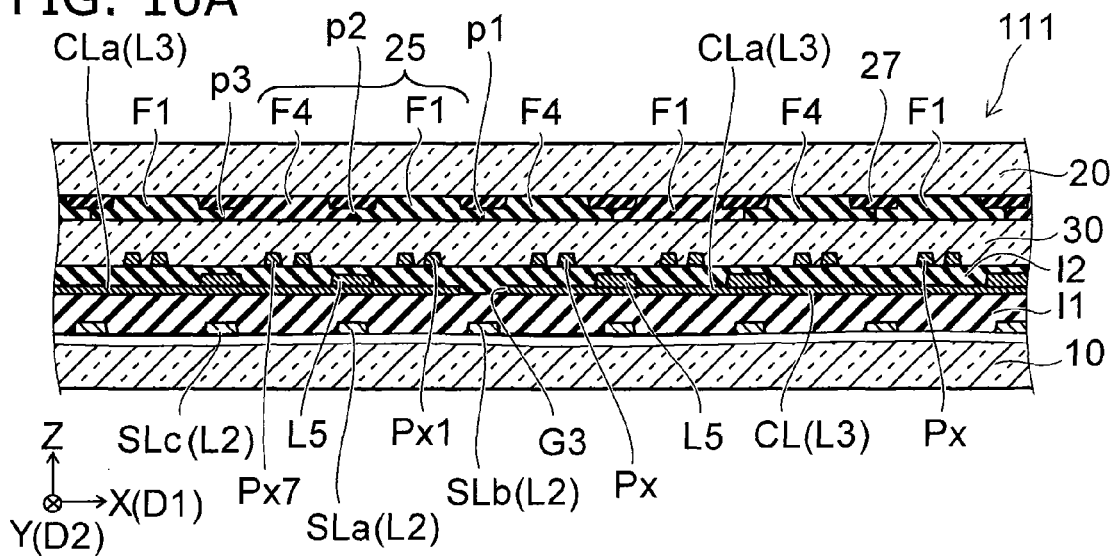
FIG. 10A and FIG. 10B are schematic cross-sectional views illustrating another display device according to the first embodiment.
Figure 10B:
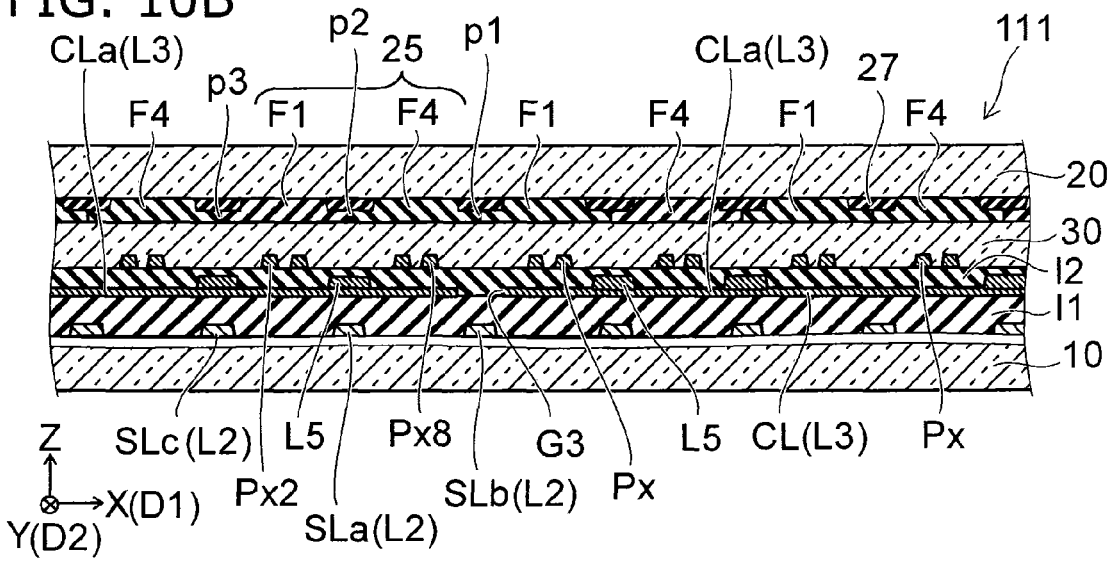

FIG. 10A and FIG. 10B are schematic cross-sectional views illustrating another display device according to the first embodiment.

These drawings illustrate the display device 111 according to the embodiment.

FIG. 10A and FIG. 10B illustrate cross sections different from the cross sections illustrated in FIG. 4A and FIG. 4B. FIG. 10A is a cross-sectional view of a portion corresponding to the first group GP1. FIG. 10B is a cross-sectional view of a portion corresponding to the second group GP2. Other than the configuration illustrated in FIGS. 10A and 10B, the configuration is the same as the configuration illustrated in FIG. 4A and FIG. 4B. Namely, the first to third color filters F1 to F3 are provided in the display device 111.

As illustrated in FIG. 10A and FIG. 10B, a fourth color filter F4 is further provided in the display device 111. The fourth color filter F4 is of a color that is different from that of the first color filter F1. The first color filter F1 is blue; and the fourth color filter F4 is, for example, white. The fourth color filter may be green or yellow.

The multiple pixel electrodes Px further include a seventh pixel electrode Px7 and an eighth pixel electrode Px8. The seventh pixel electrode Px7 and the eighth pixel electrode Px8 are electrically connected to the first color interconnect SLa via the switch elements 11 (not shown in these drawings).

As shown in FIG. 10A, the seventh pixel electrode Px7 and the fourth color filter F4 overlap when projected onto the X-Y plane. As shown in FIG. 10B, the eighth pixel electrode Px8 and the fourth color filter F4 overlap when projected onto the X-Y plane. The seventh pixel electrode Px7 and the eighth pixel electrode Px8 are the pixel electrodes Px that correspond to the fourth color.

Figure 11:
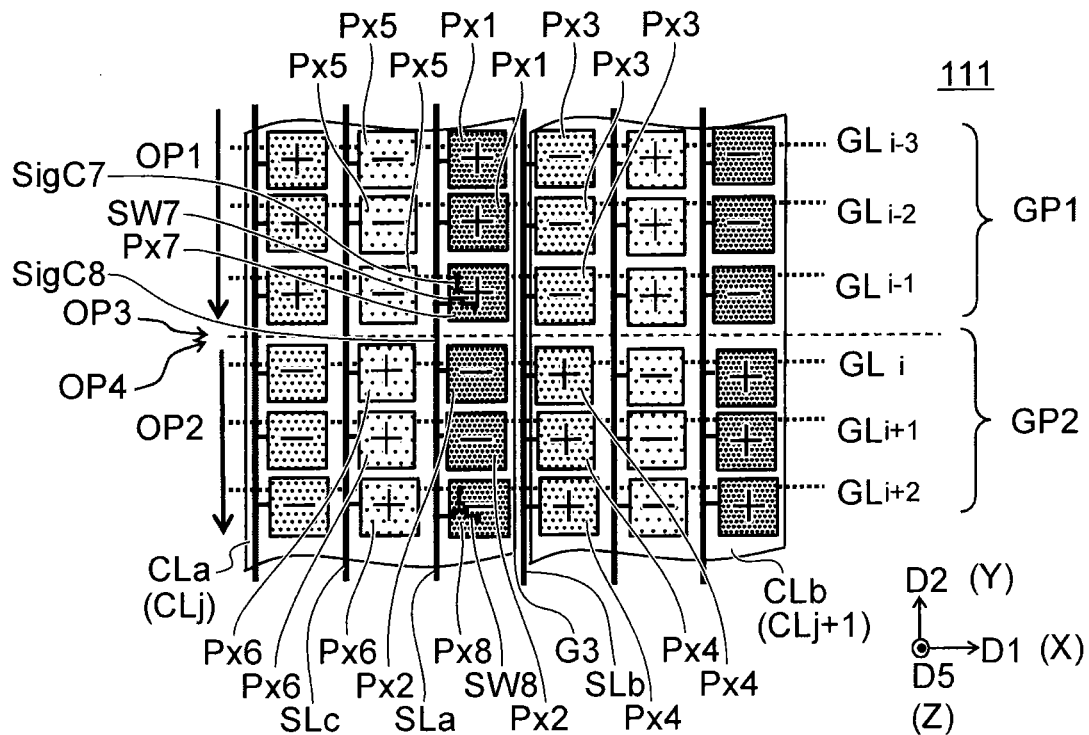
FIG. 11 is a schematic view illustrating another display device according to the embodiment.

FIG. 11 illustrates the configuration and operations of the display device 111 according to the embodiment.

As illustrated in FIG. 11, an (i−3)th gate line GL(i−3) and an (i+2)th gate line GL(i+2) (i being an integer not less than 4) are further provided. The (i−3)th gate line GL(i−3) is included in the first group GP1. The (i+2)th gate line GL(i+2) is included in the second group GP2.

The seventh pixel electrode Px7 is electrically connected to the switch element 11 (a seventh switch SW7) that is connected to the first color interconnect SLa and the gate line GL (in the example, the (i−1)th gate line GL(i−1)) included in the first group GP1. The eighth pixel electrode Px8 is electrically connected to the switch element 11 (an eighth switch SW8) that is connected to the first color interconnect SLa and the gate line GL (in the example, the (i+2)th gate line GL(i+2)) included in the second group GP2.

Thus, in addition to the first pixel electrode Px1 (blue) and the second pixel electrode Px2 (blue), the seventh pixel electrode Px7 (the fourth color) and the eighth pixel electrode Px8 (the fourth color) may be electrically connected to the first color interconnect SLa.

In other words, in addition to the pixel electrode Px of the first color, the pixel electrode Px of the fourth color may be provided for the first color interconnect SLa.

For example, the multiple first color filters F1 of the first color are provided in the display device 111. The multiple switch elements 11 include the seventh switch SW7 and the eighth switch SW8. The seventh switch SW7 is electrically connected to the first color interconnect SLa and one of the multiple first interconnects L1 (in the example, the (i−1)th gate line GL(i−1)) included in the first group GP1.

The eighth switch SW8 is electrically connected to the first color interconnect SLa and one of the multiple first interconnects L1 (in the example, the (i+2)th gate line GL(i+2)) included in the second group GP2.

The multiple pixel electrodes Px include the seventh pixel electrode Px7 and the eighth pixel electrode Px8.

The seventh pixel electrode Px7 is electrically connected to the seventh switch SW7.

The eighth pixel electrode Px8 is electrically connected to the eighth switch SW8.

When projected onto the X-Y plane, at least a portion of the multiple first color filters F1 and the multiple first pixel electrodes Px1 overlap, and at least a portion of the multiple first color filters F1 and the multiple second pixel electrodes Px2 overlap.

The multiple first color filters F1, the seventh pixel electrode Px7, and the eighth pixel electrode Px8 do not overlap. In the example, the fourth color filter F4 and the seventh pixel electrode Px7 overlap; and the fourth color filter F4 and the eighth pixel electrode Px8 overlap.

In such a case, the controller 60 sets the polarity of the seventh pixel electrode Px7 to be the same as the polarity of the first pixel electrode Px1. The controller 60 sets the polarity of the eighth pixel electrode Px8 to be the same as the polarity of the second pixel electrode Px2.

For example, in the first operation OP1, the controller 60 selects the one of the multiple first interconnects L1 included in the first group GP1 and supplies a seventh color image signal SigC7 of the first polarity (e.g., the positive polarity) to the first color interconnect SLa.

In the second operation OP2, the controller 60 selects the one of the multiple first interconnects L1 included in the second group GP2 and supplies an eighth color image signal SigC8 of the second polarity (e.g., the negative polarity) to the first color interconnect SLa.

In such a case as well, the nonuniformity of the display (at least one of the vertical crosstalk or the light leakage) is suppressed. In the display device 111 as well, the nonuniformity of the display is suppressed; and a high-quality display can be provided.

Figure 12:
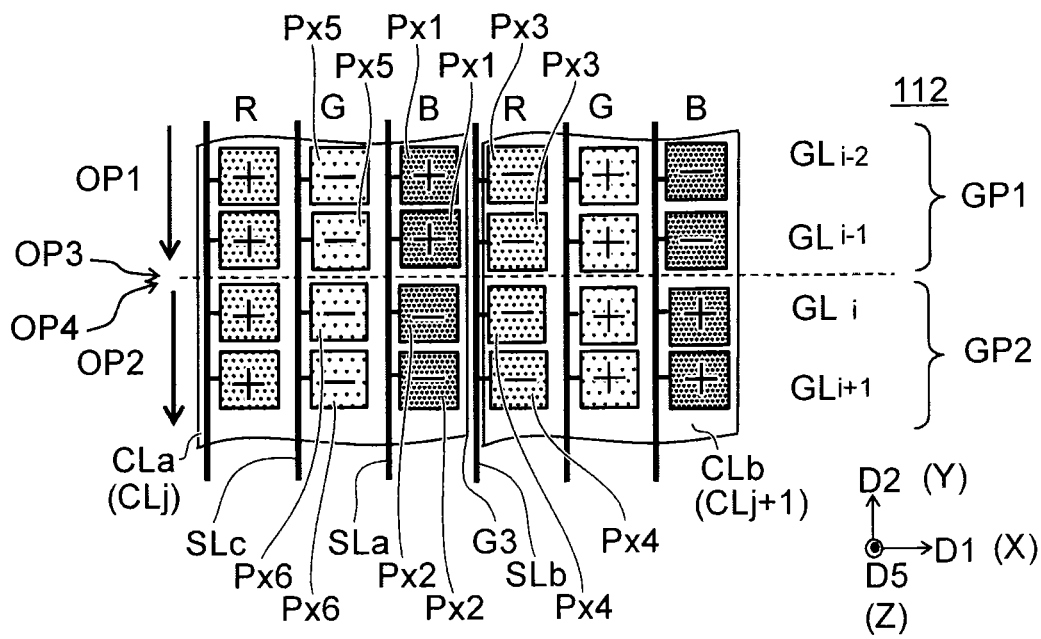
FIG. 12 is a schematic view illustrating another display device according to the first embodiment.

FIG. 12 is a schematic view illustrating another display device according to the first embodiment.

FIG. 12 illustrates the operations of the display device 112 according to the embodiment.

In the display device 112 as illustrated in FIG. 12, the polarity is inverted between the first pixel electrode Px1 and the second pixel electrode Px2. On the other hand, the polarity is the same between the third pixel electrode Px3 and the fourth pixel electrode Px4. The polarity is the same between the fifth pixel electrode Px5 and the sixth pixel electrode Px6.

In other words, in the operations of the display device 112 according to the embodiment, V line inversion driving is performed for the first group GP1. For the blue pixel column, the polarities of the signal lines SL are inverted between the first group GP1 and the second group GP2. On the other hand, for the red pixel column and the green pixel column, normal V line inversion driving is performed in the state in which the polarities are the same between the first group GP1 and the second group GP2. Thus, in the display device 112, driving is performed in which the driving is column inversion driving, and the polarities are inverted before and after the non-display interval only for one of the pixel columns. For example, such driving is called "partial split V line inversion."

In other words, it can be said that the controller 60 further supplies the pixel signals Sig of polarities inverted between the first pixel row and the second pixel row only for the pixel column (in the embodiment, the blue pixel column) corresponding to the at least one color in the state in which the pixel signals Sig of mutually-inverted polarities between the mutually-adjacent pixel columns are supplied (the state in which column inversion driving as an entirety is performed), where the pixel signal Sig is applied to the first pixel row in the first display interval DT1, the second pixel row is arranged with the first pixel row, and the pixel signal Sig is applied to the second pixel row in the second display interval DT2 after the first display interval DT1.

In such a case, for example, the slit (the gap G3) that is provided in the common lines CL is provided at a position so that the slit and the first color interconnect SLa (the first pixel electrode Px1 and the second pixel electrode Px2) corresponding to the blue pixels overlap. The light leakage that occurs due to the slit being provided occurs at the blue pixels having the low visibility. The nonuniformity of the display can be suppressed by providing the slit between the common lines CL at the side of the blue pixels, by disposing the first color interconnect SLa of the blue pixel column at a position matching the slit in the vertical direction, and by performing polarity inversion driving before and after the non-display interval in this state.

The visibility of blue is lower than the visibility of green and lower than the visibility of red. Column inversion is performed for the pixel columns of the green pixel and the red pixel having high visibility; and V blanking inversion is performed for the pixel columns of the blue pixel. Thereby, the vertical crosstalk and the lateral lines are suppressed. The display quality improves.

In the embodiment, although driving is performed in which the polarities of the signal lines SL are inverted before and after the non-display interval for only blue from the relationship of the visibilities while performing column inversion driving as an entirety, the color type for which the polarities are inverted may be red or green. Also, it is possible to employ driving in which the polarity inversion is performed before and after the non-display interval for two of the three colors, and the polarities are not inverted before and after the display interval for only one color.

Second Embodiment

Figure 13A:
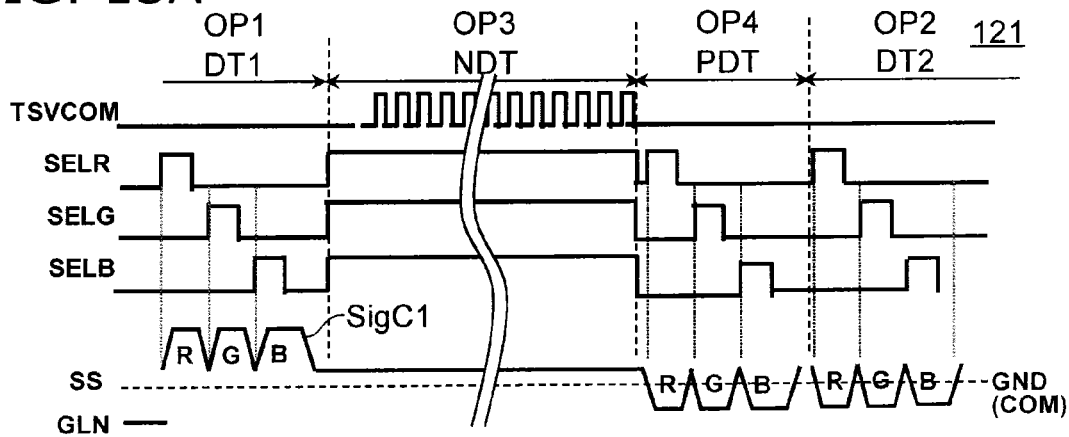
FIG. 13A to FIG. 13C are schematic views illustrating other display devices according to a second embodiment.
Figure 13B:
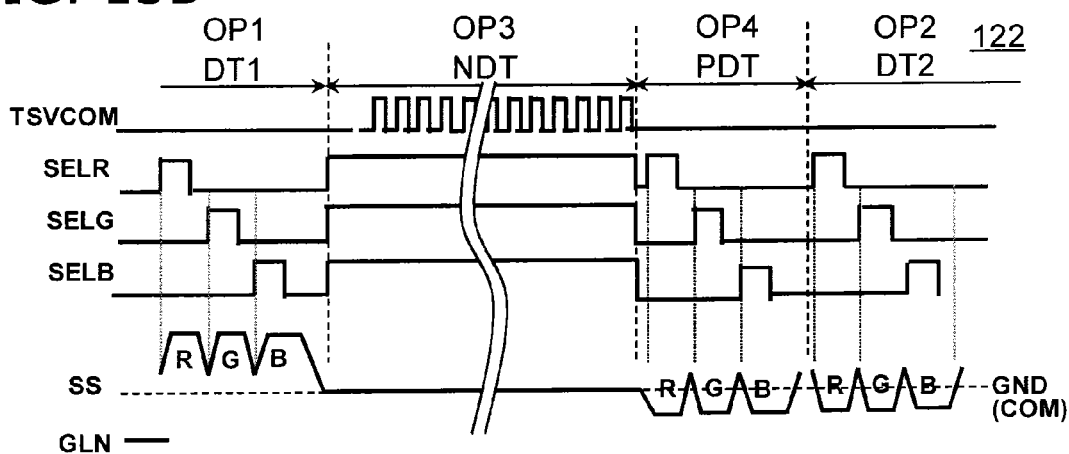
Figure 13C:
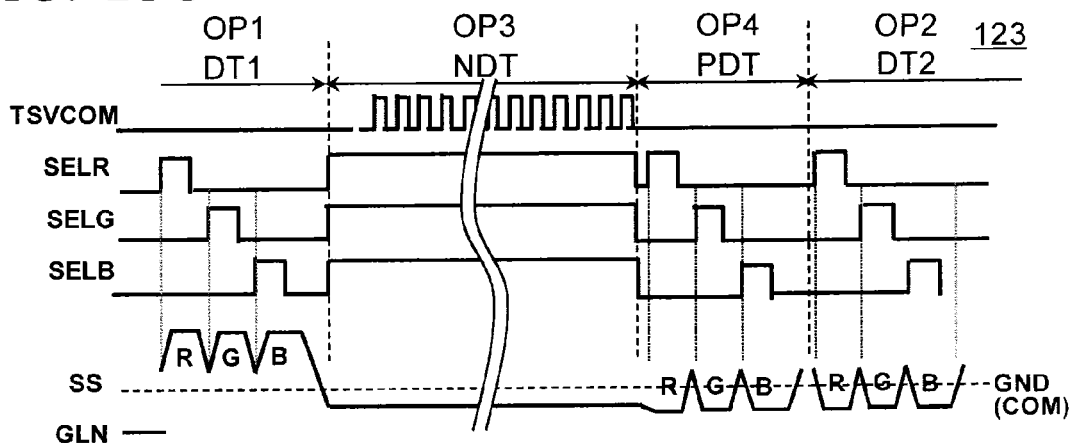

FIG. 13A to FIG. 13C are schematic views illustrating other display devices according to a second embodiment.

FIG. 13A to FIG. 13C illustrate the operations of the display devices 121 to 123 according to the embodiment. These figures illustrate the source signal SS in the third operation OP3.

For example, in the first operation OP1 as illustrated in FIG. 13A, the potential of the first pixel electrode Px1 is the potential of the first color image signal SigC1. The first counter interconnect CLa (the common line CL) is set to the common potential COM. The common potential COM is, for example, the ground potential GND or a potential near the ground potential GND. On the other hand, the potential in the unselected state of the gate lines GL is set to an unselected gate potential GLN. The unselected gate potential GLN is, for example, the potential in the unselected state of the multiple first interconnects L1 included in the first group GP1. The unselected gate potential GLN may be, for example, the potential in the unselected state of the multiple first interconnects L1 included in the second group GP2.

In the third operation OP3 in the display device 121 shown in FIG. 13A, the controller 60 sets the potential of the signal line SL (e.g., the first color interconnect SLa) to be lower than the potential (the first color image signal SigC1) of the first pixel electrode Px1. Specifically, in the example, the potential of the signal line SL (e.g., the first color interconnect SLa) is set to be between the potential (the first color image signal SigC1) of the first pixel electrode Px1 and the potential (the common potential COM) of the first counter interconnect CLa (the common line CL).

In the third operation OP3 in the display device 122 shown in FIG. 13B, the controller 60 sets the potential of the signal line SL (e.g., the first color interconnect SLa) to be not more than the potential (the common potential COM) of the first counter interconnect CLa (the common line CL). In the example, the potential of the signal line SL (e.g., the first color interconnect SLa) is the same as the potential (the average potential) of the first counter interconnect CLa (the common line CL).

In the third operation OP3 in the display device 123 shown in FIG. 13C, the controller 60 sets the potential of the signal line SL (e.g., the first color interconnect SLa) to be lower than the potential (the common potential COM) of the first counter interconnect CLa (the common line CL). For example, the potential of the signal line SL (e.g., the first color interconnect SLa) is set to be between the unselected gate potential GLN and the potential of the first counter interconnect CLa.

In the third operation OP3 (e.g., the sensing interval of the touch input) in the display device 121, the potential of the signal line SL is positioned at substantially the center of the signal for displaying the image. The drive circuit is simple in the example.

In the display device 122, the potential of the signal line SL in the third operation OP3 is lower than the display device 121 and is the ground potential GND (or the common potential COM). In such a case as well, the drive circuit is simple.

In the display device 123, the potential of the signal line SL in the third operation OP3 is lower than that of the display device 122. The pixel electrode Px when writing (e.g., in the first operation OP1 and the second operation OP2) is lower than the potential of the signal line SL due to the capacitance splitting of the switch element 11. In other words, the potential of the signal line SL is higher than the potential of the pixel electrode Px. In such a case, by considering the electric field that is generated and the capacitive coupling between the signal line SL and the pixel electrode Px, the potential of the signal line SL in the third operation OP3 is set to be lower than the potential of the signal line SL when writing. Thereby, in the third operation OP3, the difference between the potential of the signal line SL and the potential of the pixel electrode Px can be small. Thereby, for example, the nonuniformity of the display can be suppressed further.

The configuration and operations described in regard to the first embodiment may be implemented in combination with the operations described in regard to the second embodiment.

Third Embodiment

Figure 14:
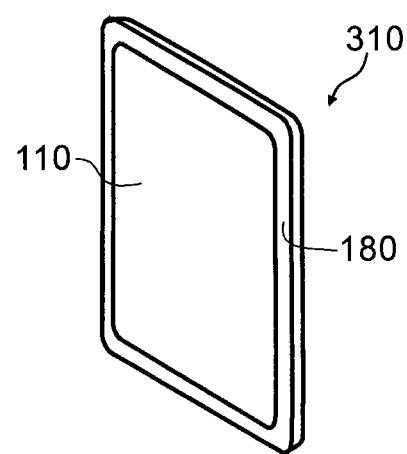
FIG. 14 is a schematic perspective view illustrating an electronic device according to a third embodiment.

FIG. 14 is a schematic perspective view illustrating an electronic device according to a third embodiment.

As shown in FIG. 14, an electronic device 310 according to the embodiment includes the display device 110. The display devices and the modifications of the display devices described in regard to the first and second embodiments may be used as the display device. In the example, the electronic device 310 further includes a housing 180 having an interior in which the display device 110 is contained. For example, a mobile telephone, a personal digital assistant, a personal computer, various information devices, etc., are used as the electronic device 310.

In the electronic device 310 according to the embodiment, a high-quality display can be provided by using the display devices according to the first and second embodiments.

According to the embodiments, a high-quality display device and an electronic device can be provided.

Although a configuration is illustrated in the embodiments in which the common lines CL extend in the Y-direction to be aligned with the signal lines SL, it is also possible to employ a configuration in which the common lines CL extend in the X-direction like the gate lines GL. In such a case, the sense lines RL extend along the Y-direction.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, those skilled in the art may similarly practice the invention by appropriately selecting specific configurations of components included in display device such as interconnects, switch elements, display layers, insulating layers, controllers, selectors and circuits, and included in electronic devices such as housings, etc., from known art. Such practice is included in the scope of the invention to the extent that similar effects thereto are obtained.

Moreover, all display devices and electronic devices practicable by an appropriate design modification by those skilled in the art based on the display devices and electronic devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

Any addition, deletion, or design change of components, or any addition, omission, or condition change of processes in the above embodiments suitably made by those skilled in the art are also encompassed within the scope of the invention as long as they fall within the spirit of the invention.

It is understood that other working-effects brought by aspects described in the embodiments are naturally produced from the invention as long as they are obvious from the specification description or they could have appropriately made by those skilled in the art.

What is claimed is:

1. A display device, comprising:
   a plurality of first interconnects extending in a first direction and being arranged in a second direction intersecting the first direction;
   a plurality of second interconnects extending in the second direction and being arranged in the first direction;
   a plurality of switch elements arranged in a matrix configuration in the first direction and the second direction, the plurality of switch elements being connected to the first interconnects and the second interconnects at each position of the plurality of switch elements;
   pixel electrodes electrically connected respectively to the switch elements;
   a plurality of third interconnects extending in the second direction, being arranged in the first direction, and opposing the plurality of pixel electrodes;
   a plurality of fourth interconnects separated from the first to third interconnects, the switch elements, and the plurality of pixel electrodes in a direction perpendicular to a plane including the first direction and the second direction, the plurality of fourth interconnects extending in a third direction and being arranged in a fourth direction, the third direction being parallel to the plane and intersecting the second direction, the fourth direction being parallel to the plane and intersecting the third direction;
   a display layer provided on the plurality of pixel electrodes, the display layer performing an optical operation of at least one of light emission or a change of an optical characteristic based on an electrical signal applied to each of the pixel electrodes; and a controller electrically connected to the plurality of first interconnects, the plurality of second interconnects, and the plurality of third interconnects, the plurality of first interconnects including:
- a first group made of multiple mutually-adjacent first interconnects; and
- a second group disposed to be adjacent to the first group, the second group being made of multiple mutually-adjacent first interconnects, the plurality of second interconnects including a first color interconnect intersecting the first and second groups of the first interconnects, the display layer being provided between the plurality of pixel electrodes and the plurality of fourth interconnects, the controller performing, in a first display interval, a first operation of sequentially selecting the first interconnects belonging to the first group and supplying a first color image signal to the first color interconnect, the first color image signal of a first polarity having a potential of the third interconnects as a reference, the controller performing, in a second display interval after the first display interval, a second operation of sequentially selecting the first interconnects belonging to the second group and supplying a second color image signal to the first color interconnect, the second color image signal being a potential of a second polarity having the potential of the third interconnects as the reference, the second polarity being reverse to the first polarity, the controller performing a third operation in a non-display interval between the first display interval and the second display interval, the third operation being different from the first operation and the second operation, and the controller sensing, in the third operation, a current flowing between at least one of the plurality of fourth interconnects and at least one of the plurality of third interconnects.

2. The display device according to claim 1, wherein the controller senses a change of the current based on a change of a capacitance between the at least one of the plurality of fourth interconnects and the at least one of the plurality of third interconnects due to an object approaching the at least one of the plurality of fourth interconnects.

3. The display device according to claim 1, wherein
the plurality of first interconnects included in the first group includes a final first interconnect most proximal to the second group,
the controller further performs a fourth operation in a pre-display interval between the non-display interval and the second display interval, the fourth operation supplying a first color pre-display signal of the second polarity to the first color interconnect, and supplies a first color final signal to the first color interconnect when the final first interconnect is selected, and
the first color pre-display signal is a signal corresponding to the first color final signal.

4. The display device according to claim 1, wherein
the plurality of first interconnects included in the first group includes a final first interconnect most proximal to the second group,
the controller further performs a fourth operation in a pre-display interval between the non-display interval and the second display interval, the fourth operation supplying a second color pre-display signal of the first polarity to the second color interconnect, and supplies a second color final signal to the second color interconnect when the final first interconnect is selected, and
the second color pre-display signal of the first polarity is a signal corresponding to the second color final signal.

5. The display device according to claim 1, further comprising a plurality of first color filters of a first color,
the plurality of switch elements including:
- a plurality of first switches electrically connected respectively to the plurality of first interconnects included in the first group, each of the plurality of first switches being electrically connected to the first color interconnect;
- a plurality of second switches electrically connected respectively to the plurality of first interconnects included in the second group, each of the plurality of second switches being electrically connected to the first color interconnect;
- a seventh switch electrically connected to the first color interconnect and one of the plurality of first interconnects included in the first group; and
- an eighth switch electrically connected to the first color interconnect and one of the plurality of first interconnects included in the second group, the plurality of pixel electrodes including:
- a plurality of first pixel electrodes electrically connected respectively to the plurality of first switches;
- a plurality of second pixel electrodes electrically connected respectively to the plurality of second switches;
- a seventh pixel electrode electrically connected to the seventh switch; and
- an eighth pixel electrode electrically connected to the eighth switch, the plurality of second pixel electrodes, the plurality of first pixel electrodes, and at least a portion of the plurality of first color filters overlapping when projected onto a plane including the first direction and the second direction, the plurality of first color filters, the seventh pixel electrode, and the eighth pixel electrode not overlapping, the controller, in the first operation of selecting the one of the plurality of first interconnects included in the first group, further supplying a seventh color image signal of the first polarity to the first color interconnect, and the controller, in the second operation of selecting the one of the plurality of first interconnects included in the second group, supplying an eighth color image signal of the second polarity to the first color interconnect.

6. The display device according to claim 1, wherein
the plurality of switch elements further includes;
- a plurality of first switches electrically connected respectively to the plurality of first interconnects included in the first group, each of the plurality of first switches being electrically connected to the first color interconnect, and
- a plurality of second switches electrically connected respectively to the plurality of first interconnects included in the second group, each of the plurality of second switches being electrically connected to the first color interconnect, the plurality of pixel electrodes further includes:
- a plurality of first pixel electrodes electrically connected respectively to the plurality of first switches, and
- a plurality of second pixel electrodes electrically connected respectively to the plurality of second switches, and the controller sets, in the third operation, a potential of the first color interconnect to be lower than a potential of the first pixel electrodes.

7. The display device according to claim 1, wherein
the plurality of switch elements further includes;
  a plurality of first switches electrically connected respectively to the plurality of first interconnects included in the first group, each of the plurality of first switches being electrically connected to the first color interconnect, and
  a plurality of second switches electrically connected respectively to the plurality of first interconnects included in the second group, each of the plurality of second switches being electrically connected to the first color interconnect,
the plurality of pixel electrodes further includes:
  a plurality of first pixel electrodes electrically connected respectively to the plurality of first switches, and
  a plurality of second pixel electrodes electrically connected respectively to the plurality of second switches,
the plurality of third interconnects includes a first counter interconnect overlapping the plurality of first pixel electrodes and the plurality of second pixel electrodes when projected onto the plane including the first direction and the second direction, and
the controller sets, in the third operation, a potential of the first color interconnect to be not more than a potential of the first counter interconnect.

8. The display device according to claim 1, wherein
the plurality of switch elements further includes:
  a plurality of first switches electrically connected respectively to the plurality of first interconnects included in the first group, each of the plurality of first switches being electrically connected to the first color interconnect, and
  a plurality of second switches electrically connected respectively to the plurality of first interconnects included in the second group, each of the plurality of second switches being electrically connected to the first color interconnect,
the plurality of pixel electrodes further includes:
  a plurality of first pixel electrodes electrically connected respectively to the plurality of first switches, and
  a plurality of second pixel electrodes electrically connected respectively to the plurality of second switches,
the plurality of third interconnects includes a first counter interconnect overlapping the plurality of first pixel electrodes and the plurality of second pixel electrodes when projected onto the plane including the first direction and the second direction, and
the controller sets, in the third operation, a potential of the first color interconnect to be between a potential of the first counter interconnect and a potential in the unselected state of the plurality of first interconnects included in the first group.

9. A display device, comprising:
a plurality of first interconnects extending in a first direction and being arranged in a second direction intersecting the first direction;
a plurality of second interconnects extending in the second direction and being arranged in the first direction;
a plurality of switch elements arranged in a matrix configuration in the first direction and the second direction, the plurality of switch elements being connected to the first interconnects and the second interconnects at each position of the plurality of switch elements;
pixel electrodes electrically connected respectively to the switch elements;
a plurality of third interconnects extending in the second direction, being arranged in the first direction, and opposing the plurality of pixel electrodes;
a display layer provided on the plurality of pixel electrodes, the display layer performing an optical operation of at least one of light emission or a change of an optical characteristic based on an electrical signal applied to each of the pixel electrodes;
a plurality of first color filters of a first color;
a plurality of second color filters of a second color, a visibility of the second color being higher than a visibility of the first color; and
a controller electrically connected to the plurality of first interconnects, the plurality of second interconnects, and the plurality of third interconnects,
the plurality of first interconnects including:
  a first group made of multiple mutually-adjacent first interconnects; and
  a second group disposed to be adjacent to the first group, the second group being made of multiple mutually-adjacent first interconnects,
the plurality of second interconnects including:
  a first color interconnect intersecting the first and second groups of the first interconnects; and
  a second color interconnect adjacent to the first color interconnect in the first direction,
the plurality of switch elements including:
  a plurality of first switches electrically connected respectively to the plurality of first interconnects included in the first group, each of the plurality of first switches being electrically connected to the first color interconnect;
  a plurality of second switches electrically connected respectively to the plurality of first interconnects included in the second group, each of the plurality of second switches being electrically connected to the first color interconnect;
  a plurality of third switches electrically connected respectively to the plurality of first interconnects included in the first group, each of the plurality of third switches being electrically connected to the second color interconnect; and
  a plurality of fourth switches electrically connected respectively to the plurality of first interconnects included in the second group, each of the plurality of fourth switches being electrically connected to the second color interconnect,
the plurality of pixel electrodes including:
  a plurality of first pixel electrodes electrically connected respectively to the plurality of first switches;
  a plurality of second pixel electrodes electrically connected respectively to the plurality of second switches;
  a plurality of third pixel electrodes electrically connected respectively to the plurality of third switches; and
  a plurality of fourth pixel electrodes electrically connected respectively to the plurality of fourth switches,
the plurality of second pixel electrodes, the plurality of first pixel electrodes, and at least a portion of the plurality of first color filters overlapping when projected onto a plane including the first direction and the second direction, the plurality of fourth pixel electrodes, the plurality of third pixel electrodes, and at least a portion of the plurality of second color filters overlapping when projected onto the plane, the controller performing, in a first display interval, a first operation of sequentially selecting the first interconnects belonging to the first group and supplying a first color image signal to the first color interconnect, the first color image signal of a first polarity having a potential of the third interconnects as a reference, the controller performing, in a second display interval after the first display interval, a second operation of sequentially selecting the first interconnects belonging to the second group and supplying a second color image signal to the first color interconnect, the second color image signal being a potential of a second polarity having the potential of the third interconnects as the reference, the second polarity being reverse to the first polarity, the controller performing a third operation in a non-display interval between the first display interval and the second display interval, the third operation being different from the first operation and the second operation, the controller, in the first operation of sequentially selecting the plurality of first interconnects belonging to the first group, further supplying a third color image signal of the second polarity to the second color interconnect, and the controller, in the second operation sequentially selecting the plurality of first interconnects belonging to the second group, further supplying a fourth color image signal of the first polarity to the second color interconnect.

10. The display device according to claim 9, wherein the plurality of third interconnects includes a second counter interconnect overlapping the plurality of third pixel electrodes and the plurality of fourth pixel electrodes when projected onto the plane.

11. The display device according to claim 10, further comprising a plurality of third color filters of a third color different from the second color, a visibility of the third color being higher than a visibility of the first color, the plurality of second interconnects further including a third color interconnect adjacent to the first color interconnect in the first direction, the first color interconnect being disposed between the second color interconnect and the third color interconnect, the plurality of switch elements further including:
a plurality of fifth switches electrically connected respectively to the plurality of first interconnects included in the first group, each of the plurality of fifth switches being electrically connected to the third color interconnect; and
a plurality of sixth switches electrically connected respectively to the plurality of first interconnects included in the second group, each of the plurality of sixth switches being electrically connected to the third color interconnect, the plurality of pixel electrodes further including:
a plurality of fifth pixel electrodes electrically connected respectively to the plurality of fifth switches; and
a plurality of sixth pixel electrodes electrically connected respectively to the plurality of sixth switches, the plurality of sixth pixel electrodes, the plurality of fifth pixel electrodes, and at least a portion of the plurality of third color filters overlapping when projected onto the plane, and the controller in the first operation sequentially selecting the plurality of first interconnects included in the first group and further supplying a fifth color image signal of the second polarity to the third color interconnect.

12. The display device according to claim 11, wherein the controller in the second operation sequentially selects the plurality of first interconnects included in the second group and further supplies a sixth color image signal of the first polarity to the third color interconnect.

13. The display device according to claim 9, wherein
the plurality of first interconnects included in the first group includes a final first interconnect most proximal to the second group,
the controller further performs a fourth operation in a pre-display interval between the non-display interval and the second display interval, the fourth operation supplying a first color pre-display signal of the second polarity to the first color interconnect, and supplying a first color final signal to the first color interconnect when the final first interconnect is selected, and
the first color pre-display signal is a signal corresponding to the first color final signal.

14. A display device, comprising:
a pair of substrates;
a liquid crystal layer provided between the pair of substrates;
a plurality of pixel electrodes arranged in a matrix configuration on one of the substrates;
a common electrode provided on one of the substrates, the common electrode being disposed to oppose the plurality of pixel electrodes arranged in the matrix configuration; and
a controller applying a pixel signal to each of the pixel electrodes, in a state of pixel signals of mutually-inverted polarities being supplied to mutually-adjacent pixel columns, the controller further supplying pixel signals of mutually-inverted polarities to a first pixel row and a second pixel row, the pixel signals being applied to the first pixel row in a first display interval, the pixel signals being applied to the second pixel row in a second display interval after the first display interval, the second pixel row being arranged with the first pixel row, a non-display interval being provided between the first display interval and the second display interval, the plurality of pixel electrodes are connected to a plurality of first interconnects and a plurality of second interconnects, the plurality of first interconnects extending in a first direction and being arranged in a second direction intersecting the first direction, the plurality of second interconnects extending in the second direction and being arranged in the first direction, the common electrode includes a plurality of third interconnects extending in the second direction, being arranged in the first direction, and opposing the plurality of pixel electrodes, the controller is electrically connected to the plurality of first interconnects, the plurality of second interconnects, and the plurality of third interconnects, the plurality of first interconnects includes:

a first group made of multiple mutually-adjacent first interconnects; and
a second group made of multiple mutually-adjacent first interconnects and disposed to be adjacent to the first group in the second direction,
the plurality of second interconnects includes a first color interconnect, a second color interconnect, and a third color interconnect, the first color interconnect intersecting the first and second groups of the first interconnects, the second color interconnect being adjacent to the first color interconnect in the first direction, the third color interconnect being adjacent to the first color interconnect in the first direction,
the controller performs, in the first display interval, a first operation of sequentially selecting the first interconnects belonging to the first group and supplying, to each of the color interconnects, a color image signal of a first polarity having a potential of the third interconnects as a reference,
the controller performs, in the second display interval, a second operation of sequentially selecting the first interconnects belonging to the second group and supplying, to each of the color interconnects, a color image signal of a second polarity having the potential of the third interconnects as the reference, the second polarity being reverse to the first polarity,
the controller performs, in the non-display interval, a third operation different from the first operation and the second operation, and
the controller performs a fourth operation in a pre-display interval, the pre-display interval being used as an interval of a latter stage of the non-display interval, the fourth operation including:
supplying a first color pre-display signal of the second polarity to the first color interconnect;
supplying a second color pre-display signal of the first polarity to the second color interconnect; and
supplying a third color pre-display signal of the first polarity to the third color interconnect.

15. A display device, comprising:
a plurality of first interconnects extending in a first direction and being arranged in a second direction intersecting the first direction;
a plurality of second interconnects extending in the second direction and being arranged in the first direction;
a plurality of switch elements arranged in a matrix configuration in the first direction and the second direction, the plurality of switch elements being connected to the first interconnects and the second interconnects at each position of the plurality of switch elements;
pixel electrodes electrically connected respectively to the switch elements;
a plurality of third interconnects extending in the second direction, being arranged in the first direction, and opposing the plurality of pixel electrodes;
a display layer provided on the plurality of pixel electrodes, the display layer performing an optical operation of at least one of light emission or a change of an optical characteristic based on an electrical signal applied to each of the pixel electrodes;
a plurality of first color filters of a first color;
a plurality of second color filters of a second color, a visibility of the second color being higher than a visibility of the first color;
a plurality of third color filters of a third color different from the second color, a visibility of the third color being higher than a visibility of the first color; and
a controller electrically connected to the plurality of first interconnects, the plurality of second interconnects, and the plurality of third interconnects,
the plurality of first interconnects including:
a first group made of multiple mutually-adjacent first interconnects; and
a second group disposed to be adjacent to the first group, the second group being made of multiple mutually-adjacent first interconnects,
the plurality of second interconnects including:
a first color interconnect intersecting the first and second groups of the first interconnects;
a second color interconnect adjacent to the first color interconnect in the first direction, and
a third color interconnect adjacent to the first color interconnect in the first direction, the first color interconnect being disposed between the second color interconnect and the third color interconnect,
the plurality of third interconnects including a second counter interconnect overlapping the plurality of third pixel electrodes and the plurality of fourth pixel electrodes when projected onto the plane,
the plurality of switch elements including:
a plurality of first switches electrically connected respectively to the plurality of first interconnects included in the first group, each of the plurality of first switches being electrically connected to the first color interconnect;
a plurality of second switches electrically connected respectively to the plurality of first interconnects included in the second group, each of the plurality of second switches being electrically connected to the first color interconnect;
a plurality of third switches electrically connected respectively to the plurality of first interconnects included in the first group, each of the plurality of third switches being electrically connected to the second color interconnect;
a plurality of fourth switches electrically connected respectively to the plurality of first interconnects included in the second group, each of the plurality of fourth switches being electrically connected to the second color interconnect;
a plurality of fifth switches electrically connected respectively to the plurality of first interconnects included in the first group, each of the plurality of fifth switches being electrically connected to the third color interconnect; and
a plurality of sixth switches electrically connected respectively to the plurality of first interconnects included in the second group, each of the plurality of sixth switches being electrically connected to the third color interconnect,
the plurality of pixel electrodes including:
a plurality of first pixel electrodes electrically connected respectively to the plurality of first switches;
a plurality of second pixel electrodes electrically connected respectively to the plurality of second switches;
a plurality of third pixel electrodes electrically connected respectively to the plurality of third switches;
a plurality of fourth pixel electrodes electrically connected respectively to the plurality of fourth switches;
a plurality of fifth switches electrically connected respectively to the plurality of first interconnects included in the first group, each of the plurality of fifth switches being electrically connected to the third color interconnect; and a plurality of sixth switches electrically connected respectively to the plurality of first interconnects included in the second group, each of the plurality of sixth switches being electrically connected to the third color interconnect, the plurality of second pixel electrodes, the plurality of first pixel electrodes, and at least a portion of the plurality of first color filters overlapping when projected onto a plane including the first direction and the second direction, the plurality of fourth pixel electrodes, the plurality of third pixel electrodes, and at least a portion of the plurality of second color filters overlapping when projected onto the plane, the plurality of sixth pixel electrodes, the plurality of fifth pixel electrodes, and at least a portion of the plurality of third color filters overlapping when projected onto the plane, the controller performing, in a first display interval, a first operation of sequentially selecting the first interconnects belonging to the first group and supplying a first color image signal to the first color interconnect, the first color image signal of a first polarity having a potential of the third interconnects as a reference, the controller performing, in a second display interval after the first display interval, a second operation of sequentially selecting the first interconnects belonging to the second group and supplying a second color image signal to the first color interconnect, the second color image signal being a potential of a second polarity having the potential of the third interconnects as the reference, the second polarity being reverse to the first polarity, the controller performing a third operation in a non-display interval between the first display interval and the second display interval, the third operation being different from the first operation and the second operation, the controller, in the first operation of sequentially selecting the plurality of first interconnects included in the first group, further supplying a third color image signal of the second polarity to the second color interconnect, the controller, in the first operation of sequentially selecting the plurality of first interconnects included in the first group, further supplying a fifth color image signal of the second polarity to the third color interconnect, the controller, in the second operation of sequentially selecting the plurality of first interconnects included in the second group, further supplying a fourth color image signal of the first polarity to the second color interconnect, the controller, in the second operation of sequentially selecting the plurality of first interconnects included in the second group, further supplying a sixth color image signal of the first polarity to the third color interconnect.

16. The display device according to claim 9, further comprising a plurality of fourth interconnects separated from the first to third interconnects, the switch elements, and the plurality of pixel electrodes in a direction perpendicular to a plane including the first direction and the second direction, the plurality of fourth interconnects extending in a third direction and being arranged in a fourth direction, the third direction being parallel to the plane and intersecting the second direction, the fourth direction being parallel to the plane and intersecting the third direction, the display layer being provided between the plurality of pixel electrodes and the plurality of fourth interconnects, and the controller sensing, in the third operation, a current flowing between at least one of the plurality of fourth interconnects and at least one of the plurality of third interconnects.

17. The display device according to claim 16, wherein the controller senses a change of the current based on a change of a capacitance between the at least one of the plurality of fourth interconnects and the at least one of the plurality of third interconnects due to an object approaching the at least one of the plurality of fourth interconnects.

18. The display device according to claim 15, further comprising a plurality of fourth interconnects separated from the first to third interconnects, the switch elements, and the plurality of pixel electrodes in a direction perpendicular to a plane including the first direction and the second direction, the plurality of fourth interconnects extending in a third direction and being arranged in a fourth direction, the third direction being parallel to the plane and intersecting the second direction, the fourth direction being parallel to the plane and intersecting the third direction, the display layer being provided between the plurality of pixel electrodes and the plurality of fourth interconnects, and the controller sensing, in the third operation, a current flowing between at least one of the plurality of fourth interconnects and at least one of the plurality of third interconnects.

19. The display device according to claim 18, wherein the controller senses a change of the current based on a change of a capacitance between the at least one of the plurality of fourth interconnects and the at least one of the plurality of third interconnects due to an object approaching the at least one of the plurality of fourth interconnects.

20. The display device according to claim 15, wherein the plurality of first interconnects included in the first group includes a final first interconnect most proximal to the second group, the controller further performs a fourth operation in a pre-display interval between the non-display interval and the second display interval, the fourth operation supplying a first color pre-display signal of the second polarity to the first color interconnect, and supplying a first color final signal to the first color interconnect when the final first interconnect is selected, and the first color pre-display signal is a signal corresponding to the first color final signal.

* * * * *